(12) United States Patent
Lu et al.

(10) Patent No.: US 12,517,331 B2
(45) Date of Patent: Jan. 6, 2026

(54) LONG-FOCUS LENS, CAMERA MODULE, AND ELECTRONIC DEVICE

(71) Applicant: HUAWEI TECHNOLOGIES CO., LTD., Guangdong (CN)

(72) Inventors: Jianlong Lu, Shanghai (CN); Haishui Ye, Shanghai (CN); Yajun Niu, Shanghai (CN); Wei Tang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 334 days.

(21) Appl. No.: 18/546,961

(22) PCT Filed: Feb. 26, 2022

(86) PCT No.: PCT/CN2022/078115
§ 371 (c)(1),
(2) Date: Aug. 17, 2023

(87) PCT Pub. No.: WO2022/179632
PCT Pub. Date: Sep. 10, 2022

(65) Prior Publication Data
US 2024/0134169 A1  Apr. 25, 2024

(30) Foreign Application Priority Data

Feb. 27, 2021 (CN) .......... 202110221352.X
Jul. 19, 2021 (CN) .......... 202110815848.X

(51) Int. Cl.
*G02B 13/00* (2006.01)
*G02B 9/62* (2006.01)
*H04N 23/958* (2023.01)

(52) U.S. Cl.
CPC .......... *G02B 13/0065* (2013.01); *G02B 9/62* (2013.01); *G02B 13/0045* (2013.01); *H04N 23/958* (2023.01)

(58) Field of Classification Search
CPC .. G02B 13/0065; G02B 9/62; G02B 13/0045; H04N 23/958
See application file for complete search history.

(56) References Cited

U.S. PATENT DOCUMENTS 5,159,494 A    10/1992  Yamanashi
5,559,636 A     9/1996  Ito
(Continued)

FOREIGN PATENT DOCUMENTS

CN    1263272 A    8/2000
CN    1752790 A    3/2006
(Continued)

*Primary Examiner* — Phu Vu

(57) ABSTRACT

This application discloses a long-focus lens, a camera module, and an electronic device. The long-focus lens includes a first lens assembly, a second lens assembly, and a third lens assembly that are arranged from an object side to an image side. The first lens assembly and the third lens assembly are fixed lens assemblies, and the second lens assembly is a focusing lens assembly. In a focusing process in which the long-focus lens is switched from a long shot to a close-up, the second lens assembly moves toward the object side along an optical axis, a combined focal length of the first lens assembly and the second lens assembly decreases, and a combined focal length of the second lens assembly and the third lens assembly decreases. The foregoing long-focus lens has a strong focusing capability and high imaging quality.

19 Claims, 9 Drawing Sheets

(56) References Cited

U.S. PATENT DOCUMENTS

| | | | |
|---|---|---|---|
| 5,642,230 A | 6/1997 | Iwata et al. | |
| 6,342,975 B1 | 1/2002 | Yamanashi | |
| 11,536,936 B2 * | 12/2022 | Yao | G02B 13/004 |
| 2012/0229921 A1 | 9/2012 | Eguchi | |
| 2019/0196148 A1 * | 6/2019 | Yao | G02B 13/0035 |
| 2019/0346660 A1 * | 11/2019 | Yokoyama | G02B 27/4211 |
| 2020/0073028 A1 * | 3/2020 | Shigemitsu | G02B 5/04 |
| 2023/0273412 A1 * | 8/2023 | Kim | G02B 13/009 359/683 |

FOREIGN PATENT DOCUMENTS

| | | |
|---|---|---|
| CN | 1945373 A | 4/2007 |
| CN | 101046549 A | 10/2007 |
| CN | 110045489 A | 7/2019 |
| CN | 110412716 A | 11/2019 |
| CN | 110488455 A | 11/2019 |
| CN | 111512204 A | 8/2020 |
| CN | 111830692 A | 10/2020 |
| CN | 112105980 A | 12/2020 |
| JP | H07152001 A | 6/1995 |
| JP | 2009237400 A | 10/2009 |
| JP | 2017040873 A | 2/2017 |

\* cited by examiner

LONG-FOCUS LENS, CAMERA MODULE, AND ELECTRONIC DEVICE

CROSS-REFERENCE TO RELATED APPLICATIONS

This application is a national stage of International Application No. PCT/CN2022/078115, filed on Feb. 26, 2022, which claims priority to Chinese Patent Application No. 202110221352.X, filed on Feb. 27, 2021 and Chinese Patent Application No. 202110815848.X, filed on Jul. 19, 2021. All of the aforementioned applications are hereby incorporated by reference in their entireties.

TECHNICAL FIELD

This application relates to the field of photographing device technologies, and in particular, to a long-focus lens, a camera module, and an electronic device.

BACKGROUND

With continuous development of portable electronic devices such as mobile phones, a user has an increasingly high requirement for shooting performance of a camera module of an electronic device. For example, it has become a development trend of a camera module to arrange a long-focus lens assembly. However, in a shooting process of a current camera module, a camera lens of the camera module usually requires a large focusing stroke to implement focusing. A focusing capability of the camera lens is weak, and a sharp change in a system aberration is also caused, resulting in poor imaging quality.

SUMMARY

This application provides a long-focus lens, a camera module, and an electronic device. The long-focus lens has a strong focusing capability and high imaging quality.

According to a first aspect, this application provides a long-focus lens includes a first lens assembly, a second lens assembly, and a third lens assembly that are arranged from an object side to an image side. The first lens assembly and the third lens assembly are fixed lens assemblies, and the second lens assembly is a focusing lens assembly. In a focusing process in which the long-focus lens is switched from a long shot to a close-up, the second lens assembly moves toward the object side along an optical axis, a combined focal length of the first lens assembly and the second lens assembly decreases, and a combined focal length of the second lens assembly and the third lens assembly decreases.

In this implementation, when the second lens assembly moves toward the object side, both the combined focal length of the first lens assembly and the second lens assembly and the combined focal length of the second lens assembly and the third lens assembly tend to decrease. The focusing process of the long-focus lens can be implemented by moving the second lens assembly by a small displacement (in other words, a small focusing stroke), and a small focusing stroke can effectively suppress an aberration problem caused by focusing, so that the long-focus lens has a strong focusing capability, can shoot both a long shot and a close-up (for example, a macro scene), and has high imaging quality and high imaging definition. In addition, because the focusing stroke required by the long-focus lens for focusing is small, a volume of a motor used to drive the second lens assembly to move is also reduced, making it easier to implement miniaturization of a camera module.

There is a first safe distance between the first lens assembly and the second lens assembly, and there is a second safe distance between the second lens assembly and the third lens assembly, to ensure that no collision occurs between optical elements in the focusing process of the long-focus lens. Factors such as the focusing stroke, a camera lens support margin, and temperature impact need to be considered for the first safe distance.

In a possible implementation, the first lens assembly has a positive focal power, the second lens assembly has a positive focal power, and the third lens assembly has a negative focal power.

In this implementation, in the long-focus lens, the focal powers of the first lens assembly, the second lens assembly, and the third lens assembly are appropriately configured, so that the second lens assembly can complete focusing by using a small focusing stroke in the focusing process. The small focusing stroke can effectively suppress aberration deterioration caused by focusing, so that the long-focus lens has a strong focusing capability, and therefore has high imaging quality and a strong macro capability. In addition, because the focusing stroke required by the long-focus lens for focusing is small, a volume of a motor used to drive the second lens assembly to move is also reduced, making it easier to implement miniaturization of a camera module.

In addition, the third lens assembly is a lens assembly that is close to an imaging plane and that has a negative focal power, and therefore has functions of a flat-field mirror, and can compensate for a partial field curvature change caused by focusing, so that a focusing capability of the second lens assembly is improved. Therefore, the long-focus lens has a strong focusing capability, and imaging quality of the camera module is higher.

In a possible implementation, a focal length F2 of the second lens assembly and an effective focal length EFL of the long-focus lens meet $0.2 < F2/EFL < 1.9$. In this implementation, $F2/EFL < 1.9$ is set, so that focusing can be implemented by moving the second lens assembly by a small displacement, to reduce the focusing stroke and improve the focusing capability. $0.2 < F2/EFL$ is set, to facilitate control of an aberration of a light beam passing through the second lens assembly, so that it is easier to perform aberration correction on the third lens assembly, and the long-focus lens has better imaging quality. Therefore, a range of a ratio of the focal length F2 of the second lens assembly to the effective focal length EFL of the long-focus lens is appropriately designed, so that both the focusing capability and the imaging quality of the long-focus lens can be considered.

In a possible implementation, a focal length F3 of the third lens assembly and the effective focal length EFL of the long-focus lens meet $-50 < F3/EFL < -0.05$. In this implementation, a range of a ratio of the focal length F3 of the third lens assembly to the effective focal length EFL of the long-focus lens is appropriately designed, so that the long-focus lens can reduce an image quality difference between long-shot shooting and close-up shooting with low assembly sensitivity, to obtain more uniform image quality.

In a possible implementation, a focal length F1 of the first lens assembly and the effective focal length EFL of the long-focus lens meet $0.5 < F1/EFL < 50$. In this implementation, an aperture value of the long-focus lens can be effectively reduced by setting $F1/EFL < 50$, and a machining difficulty of the first lens assembly is reduced by setting $0.5 < F1/EFL$, so that it is easy to machine the first lens assembly, in other words, processability of the first lens assembly is good. Therefore, a range of a ratio of the focal length F1 of the first lens assembly to the effective focal length EFL of the long-focus lens is appropriately designed, so that both the aperture value of the long-focus lens and the processability of the first lens assembly can be considered.

It may be understood that the foregoing limitations on the ranges of the ratios of the focal length F1 of the first lens assembly, the focal length F2 of the second lens assembly, and the focal length F3 of the third lens assembly to the effective focal length EFL of the long-focus lens may exist independently, or may be combined with each other. When the foregoing three ratio ranges are combined with each other, the long-focus lens can obtain a better aperture value, a better focusing capability, better imaging quality, and better processability. In some implementations, the camera module may implement macro shooting within 10 cm by using the long-focus lens, and the camera module has a strong macro capability.

In a possible implementation, the first lens assembly includes a first reflection member and a first lens, the first lens has a positive focal power and is located on an object side of the first reflection member, the first reflection member changes a propagation direction of the optical axis from a first direction to a second direction, and the second direction intersects the first direction.

In this implementation, the long-focus lens changes a propagation direction of rays by arranging the first reflection member in the first lens assembly, so that propagation directions of a light beam in the second lens assembly and the third lens assembly may be different from a direction in which the light beam enters the electronic device, a placement position, an angle, space, and the like of the camera module are more flexible, and the long-focus lens can be used in a periscope camera module. In addition, the light beam starts to shrink after passing through the first lens, and reaches the second lens assembly after being reflected by the first reflection member. The light beam has already shrunk through a long optical path, and a diameter of the light beam is small. Therefore, the second lens assembly is no longer a maximum limit of a clear aperture of the long-focus lens, to effectively increase the clear aperture and implement a small aperture value.

In addition, because the first lens has a positive focal power, the first lens shrinks a light beam, so that a diameter of a light beam entering the second lens assembly is small, and apertures of the second lens assembly and the third lens assembly are no longer maximum limits on the clear aperture. Therefore, the clear aperture of the long-focus lens can be effectively increased while a module size is considered, and the long-focus lens has a small aperture value. In this implementation, the aperture value of the long-focus lens may be less than 2.8.

In a possible implementation, the first reflection member is a prism, an image side surface of the first lens is a flat surface and is fastened to an object side surface of the first reflection member, and a curvature radius R1 of an object side surface of the first lens and a refractive index N1 of the first lens meet R1/N1>4.

In this implementation, the curvature radius R1 of the object side surface of the first lens is appropriate, so that machining is easy. The first lens can ensure good image quality while reducing the aperture value.

In a possible implementation, a reflective surface of the first reflection member may be a flat surface, to provide good machinability. In another possible implementation, the reflective surface of the first reflection member may be a spherical surface, a cylindrical surface, or a free curved surface. In this case, when implementing reflection of rays, the reflective surface of the first reflection member may further correct an aberration such as astigmatism, to further improve image quality or reduce a volume.

In a possible implementation, the first lens assembly includes at least two lenses, and the last lens that is of the first lens assembly and that is closest to the image side is located on the object side or an image side of the first reflection member. When the last lens that is of the first lens assembly and that is closest to the image side is located on the object side of the first reflection member, at least two lenses of the first lens assembly are both located on the object side of the first reflection member. When the last lens that is of the first lens assembly and that is closest to the image side is located on the image side of the first reflection member, some lenses of the first lens assembly are located on the object side of the first reflection member, and some lenses are located on the image side of the first reflection member. When the lenses of the first lens assembly are separately disposed on two sides of the first reflection member, space utilization of the first lens assembly is high, and it is easy to arrange the lenses.

In a possible implementation, the first lens assembly further includes at least one lens that has a negative focal power and that is located on an image side of the first reflection member. In this implementation, the lens or the lens assembly located on the image side of the first reflection member has a negative focal power, so that an incident angle of a light beam on the second lens assembly can be reduced, to reduce a design difficulty of the second lens assembly, and achieve a better imaging effect.

In a possible implementation, the first lens assembly may further include a lens that has a negative focal power and that is located on the object side of the first reflection member. The lens and the first lens are used together to form a positive-negative lens cooperation structure, to better resolve aberration problems such as a chromatic aberration.

In a possible implementation, the second lens assembly includes at least one lens, and the $1^{st}$ lens that is of the second lens assembly and that is closest to the object side may have a negative focal power. In this implementation, the $1^{st}$ lens in the second lens assembly can cooperate with the first lens assembly with a positive focal power, to resolve aberration problems such as a chromatic aberration.

In another possible implementation, the second lens assembly includes at least one lens. When the first lens assembly includes at least one lens that has a negative focal power and that is located on the image side of the first reflection member, the $1^{st}$ lens that is of the second lens assembly and that is closest to the object side may have a positive focal power. In this case, the light beam passing through the first lens assembly can smoothly enter the second lens assembly, which helps improve the imaging quality of the long-focus lens.

In a possible implementation, the third lens assembly includes a second reflection member, the second reflection member changes the propagation direction of the optical axis from the second direction to a third direction, and the third direction intersects the second direction; and the third lens assembly includes at least one lens located on an object side or an image side of the second reflection member, or the third lens assembly includes at least one lens located on the object side of the second reflection member and at least one lens located on the image side of the second reflection member.

In this implementation, the optical axis includes a first part from the object side surface of the first lens to the reflective surface of the first reflection member, a second part from the reflective surface of the first reflection member to a reflective surface of the second reflection member, and a third part from the reflective surface of the second reflection member to a photosensitive element. In a focusing process in which the long-focus lens is switched from a long shot to a close-up, neither of the first lens assembly and the third lens assembly moves, and the second lens assembly moves along the second part of the optical axis toward the first lens assembly, to implement focusing. Because none of the first part, the second part, and the third part of the optical axis changes in the focusing process, a thickness of an optical system of the long-focus lens is a sum of a size of the first part of the optical axis and a size of the third part of the optical axis, and a focusing stroke of the long-focus lens does not cause an increase in the thickness of the optical system. This facilitates miniaturization of the long-focus lens and the camera module.

In addition, because the first reflection member and the second reflection member are disposed in the long-focus lens, a target surface of the photosensitive element is parallel to the first lens, and a size of the target surface is not limited by a size in a thickness direction of the electronic device, to facilitate design of a large target surface of the camera module.

In a possible implementation, the reflective surface of the second reflection member may be a flat surface, to provide good machinability. In another possible implementation, the reflective surface of the second reflection member may be a spherical surface, a cylindrical surface, or a free curved surface. In this case, when implementing reflection of rays, the reflective surface of the second reflection member may further correct an aberration such as astigmatism, to further improve image quality or reduce a volume.

In a possible implementation, the third lens assembly includes a second reflection member, the second reflection member changes the propagation direction of the optical axis from the second direction to a third direction, and the third direction intersects the second direction; and the third lens assembly further includes at least one lens that has a negative focal power and that is located on an image side of the second reflection member, so that image quality can be effectively compensated, and the imaging quality of the long-focus lens can be improved.

In a possible implementation, the first lens assembly includes a lens having a positive focal power, and an Abbe number of the lens is greater than 40. In this case, the first lens assembly can ensure that no excessively large residual chromatic aberration is generated, to reduce design difficulty of a lens assembly located on an image side of the first lens assembly.

In a possible implementation, the long-focus lens further includes an aperture diaphragm, and the aperture diaphragm is mounted on the second lens assembly. In this case, an aperture adjustment effect of the aperture diaphragm is better, and the imaging quality of the long-focus lens can be improved.

In a possible implementation, an optical surface of at least one lens of the long-focus lens is an aspheric surface or a free curved surface, so that an imaged picture has more balanced image quality, and an aberration is corrected.

In a possible implementation, an optical surface of at least one lens of the long-focus lens forms a diffraction grating structure. In this implementation, the diffraction grating structure is appropriately disposed, so that a chromatic aberration can be reduced, and a volume of the long-focus lens can be reduced.

In a possible implementation, the long-focus lens further includes a liquid lens, and the liquid lens is located between the first lens assembly and the second lens assembly. In this implementation, a focus adjustment effect can be enhanced by using a liquid lens, to implement ultra-macro shooting.

According to a second aspect, this application further provides a camera module, including a photosensitive element and the long-focus lens according to any foregoing implementation. The photosensitive element is located on an image side of the long-focus lens. The camera module has a strong focusing capability and high imaging quality.

According to a third aspect, this application further provides an electronic device, including an image processor and the foregoing camera module. The image processor is communicatively connected to the camera module. The image processor is configured to obtain image data from the camera module and process the image data.

DESCRIPTION OF EMBODIMENTS

Figure 1:
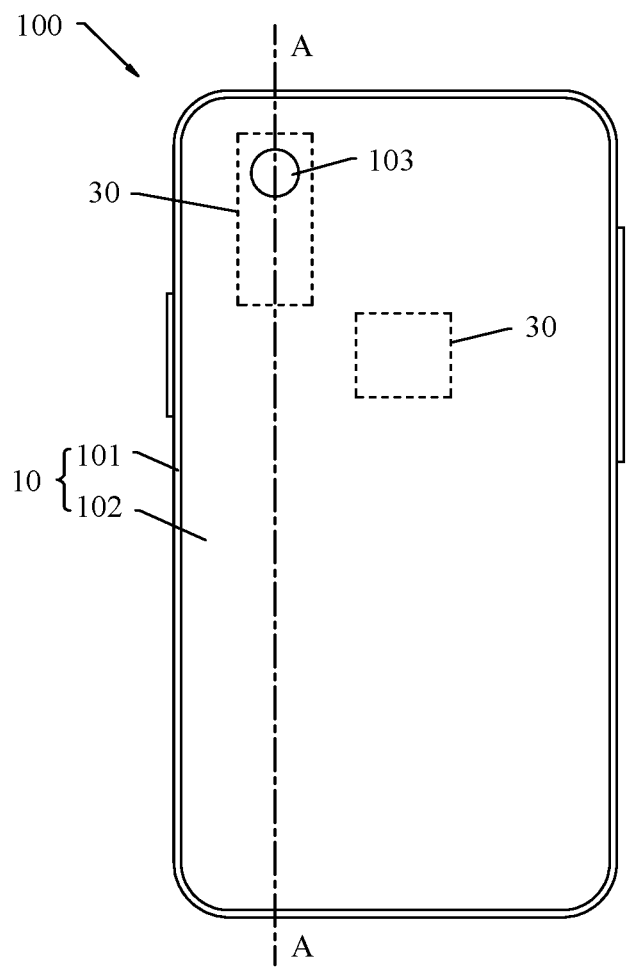
FIG. 1 is a schematic diagram of a structure of an electronic device in some embodiments according to an implementation of this application.

For ease of understanding, the following first explains and describes English abbreviations and related technical terms in embodiments of this application.

A focal power (focal power) is equal to a difference between convergence of an image beam and convergence of an object beam, and represents a capability of an optical system to refract rays.

For a lens or a lens assembly with a positive focal power, the lens or lens assembly has a positive focal length, and has an effect of converging rays.

For a lens or a lens assembly with a negative focal power, the lens or lens assembly has a negative focal length, and has an effect of diverging rays.

A focal length (focal length) is a measurement of how strongly the optical system converges or diverges light, and refers to, when a clear image of an infinite scene is formed on a focal plane by using a lens or a lens assembly, a vertical distance from an optical center of the lens or the lens assembly to the focal plane. From a practical perspective, the focal length may be understood as a distance from a center of a camera lens to a plane when an object is at an infinite distance. For a prime lens, a location of an optical center of the prime lens is fixed. For a long-focus lens, a change in an optical center of a camera lens causes a change in a focal length of the camera lens.

An effective focal length (effective focal length, EFL) of a camera lens is a distance from a center of the camera lens to a focal point.

For an object side surface, with a lens as a boundary, a side on which a shot object is located is an object side, and a surface of the lens close to the object side is referred to as the object side surface.

For an image side surface, with a lens as a boundary, a side on which an image of a shot object is located is an image side, and a surface of the lens close to the image side is referred to as the image side surface.

An aperture diaphragm (aperture diaphragm) is a device used to control an amount of light reaching a light-sensitive surface after rays pass through a camera lens, and is usually located in the camera lens.

An aperture value, also referred to as an F number (Fno), is a relative value (a reciprocal of a relative aperture) obtained by dividing a focal length of a camera lens by an entrance pupil diameter of the camera lens. When the aperture value is smaller, an amount of admitted light in a same unit time is larger. When the aperture value is larger, a depth of field is smaller, and shot background content is blurred, similar to an effect of a long-focus lens.

A total track length (total track length, TTL) is a total length from a surface of a camera lens closest to an object side to an imaging plane. The TTL is a main factor that determines a camera height.

An imaging plane is a carrier plane that is located on image sides of all lenses in a long-focus lens and on which an image is formed after rays sequentially pass through the lenses in the long-focus lens.

An optical axis is an axis that runs vertically through the center of a lens. An optical axis of a camera lens is an axis that passes through centers of lenses of the camera lens. When rays parallel to the optical axis enter a convex lens, an ideal convex lens converges all rays at one point behind the lens. This point at which all the rays converge is a focal point.

The focal point is a point at which parallel rays converge after being refracted by a lens or a lens assembly.

An image focal plane, also referred to as a rear focal plane or a second focal plane, is a flat surface that passes through an image focal point (also referred to as a rear focal point or a second focal point) and that is perpendicular to an optical axis of a system.

An Abbe number, in other words, a dispersion coefficient, is a difference ratio of refractive indices of an optical material at different wavelengths, and represents a degree of dispersion of the material.

Aberration: A paraxial region of an optical system has the properties of an ideal optical system. A paraxial ray emitted from a point on an object intersects an image plane at one point (in other words, a paraxial image point). However, rays actually passing through different apertures of a camera lens can hardly perfectly intersect at one point. Instead, there are deviations from the position of the paraxial image point. These deviations are collectively referred to as aberrations.

An axial chromatic aberration (longitudinal spherical aber) is also referred to as a longitudinal chromatic aberration or a positional chromatic aberration or an axial chromatic aberration. A beam of rays parallel to an optical axis converges at different positions after passing through a camera lens. This aberration is referred to as a positional chromatic aberration or an axial chromatic aberration. This is because positions of images formed by the camera lens for light of different wavelengths are different, so that image focal planes of light of different colors cannot overlap during final imaging, and polychromatic light is scattered to form dispersion.

A distortion (distortion) is a degree at which an image formed by an optical system for an object is distorted relative to the object. A distortion is caused because a height of a point at which chief rays with different fields of view intersect a Gaussian image plane after the chief rays pass through the optical system is not equal to an ideal image height due to impact of a diaphragm spherical aberration, and a difference between the two heights is a distortion. Therefore, a distortion only changes an imaging position of an off-axis object point on an ideal plane, so that a shape of an image is distorted, but definition of the image is not affected.

ImgH (Image Height) indicates a half of a diagonal length of an effective pixel area on a photosensitive chip, in other words, an image height of an imaging plane.

Astigmatism (astigmatism): Because an object point is not on an optical axis of an optical system, a beam emitted by the object point has an oblique angle to the optical axis. After the beam is refracted by a lens, convergence points of a meridian pencil and a sagittal pencil are not a same point. That is, the beam cannot be focused at one point, and imaging is not clear, resulting in astigmatism. The meridian pencil and the sagittal pencil are names of beams in two vertical planes in a rotationally symmetrical optical system.

A meridian plane (meridian plane) is a flat surface formed by main rays (a main beam) of an object point outside an optical axis and the optical axis.

A sagittal plane (sagittal plane) is a flat surface that passes through the main array (main beam) of the object point outside the optical axis and that is perpendicular to the meridian plane.

A curvature of field (curvature of field) is used for indicating a difference in an optical axis direction between a position of the clearest image point in a non-central field of view array passing through an optical camera lens assembly and a position of the clearest image point in a central field of view. When a lens has a curvature of field, an intersection of a whole beam does not coincide with an ideal image point. Although a clear image point can be obtained at each specific point, a whole image plane is a curved surface.

The following describes technical solutions of embodiments in this application with reference to the accompanying drawings. In the descriptions of embodiments of this application, unless otherwise specified, "/" indicates "or". For example, A/B may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in the descriptions of embodiments of this application, "a plurality of" means two or more.

In the following, terms such as "first" and "second" are used only for description purposes, and cannot be understood as implying or implying relative importance or implicitly indicating a quantity of indicated technical features. Therefore, a feature limited by "first" or "second" may explicitly or implicitly include one or more features.

Embodiments of this application provide a long-focus lens, a camera module in which the long-focus lens is used, and an electronic device including the camera module. The long-focus lens includes a first lens assembly, a second lens assembly, and a third lens assembly that are sequentially arranged from an object side to an image side. The first lens assembly and the third lens assembly are fixed lens assemblies, and the second lens assembly is a focusing lens assembly. In a focusing process in which the long-focus lens is switched from a long shot to a close-up, the second lens assembly moves toward the object side along an optical axis, a combined focal length of the first lens assembly and the second lens assembly decreases, and a combined focal length of the second lens assembly and the third lens assembly decreases. In this embodiment, in a focusing process of the second lens assembly, focusing can be completed by using a small focusing stroke. The small focusing stroke can effectively suppress an aberration problem caused by focusing, so that the long-focus lens has a strong focusing capability, can shoot both a long shot and a close-up (for example, a macro scene), and has high imaging quality and high imaging definition. The electronic device may be a device that has a photographing or video recording function, for example, a mobile phone, a tablet computer, a laptop computer, or a wearable device.

Figure 2:
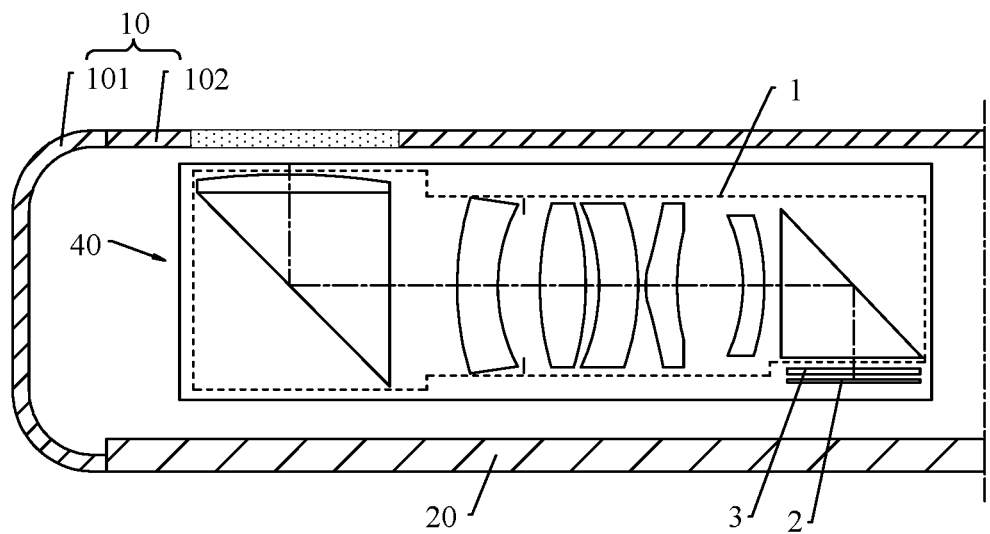
FIG. 2 is a schematic diagram of a partial structure of the electronic device shown in FIG. 1 cut along a line A-A.

FIG. 1 is a schematic diagram of a structure of an electronic device 100 in some embodiments according to an embodiment of this application. FIG. 2 is a schematic diagram of a partial structure of the electronic device 100 shown in FIG. 1 cut along a line A-A. In this embodiment, an example in which the electronic device 100 is a mobile phone is used for description.

The electronic device 100 includes a housing 10, a display 20, an image processor 30, and a camera module 40. In some embodiments, the housing 10 includes a frame 101 and a rear cover 102. The frame 101 and the rear cover 102 may be an integrated structure, or may be assembled to form an integrated structure. The display 20 and the rear cover 102 are respectively mounted on two sides of the frame 101, and jointly surround an inner cavity of the entire device.

The image processor 30 and the camera module 40 are accommodated in the inner cavity of the entire device. The image processor 30 and the camera module 40 are in a communication connection, and the image processor 30 is configured to obtain image data from the camera module 40 and process the image data. The communication connection between the camera module 40 and the image processor 30 may be implemented in an electrical connection manner such as cabling or in a coupling manner or the like, for data transmission. It can be understood that the communication connection between the camera module 40 and the image processor 30 may alternatively be implemented in another manner that can implement data transmission.

The image processor 30 optimizes a digital image signal, and transmits the processed signal to the display. The image processor 30 may be an image processing chip or a digital signal processing chip. The image processor 30 is configured to quickly and timely transfer data obtained by a photosensitive chip to a central processing unit and refresh the photosensitive chip. Therefore, quality of the image processor 30 directly affects picture quality (for example, color saturation and definition).

In this embodiment, a camera hole 103 is provided in the rear cover 102, the camera module 40 acquires rays through the camera hole 103, and the camera module 40 is used as a rear-facing camera of the electronic device 100. For example, the rear cover 102 includes a transparent lens, and the transparent lens is mounted on the camera hole 103, to allow light to pass through, and can be dustproof and waterproof. In some other embodiments, the camera module 40 may be used as a front-facing camera of the electronic device 100.

It may be understood that a mounting position of the camera module 40 of the electronic device 100 in the embodiment shown in FIG. 1 is merely an example. The mounting position of the camera module 40 is not strictly limited in this application. In some other embodiments, the camera module 40 may be mounted in another position of the electronic device 100. For example, the camera module 40 may be mounted in the upper middle or the upper right corner of the rear of the electronic device 100. In some other embodiments, the electronic device 100 may include a terminal body and an auxiliary component that can rotate, move, or disassemble relative to the terminal body, and the camera module 40 may be disposed on the auxiliary component.

In some embodiments, the electronic device 100 may further include an analog-to-digital converter (also referred to as an A/D converter, which is not shown in the figure). The analog-to-digital converter is connected between the camera module 40 and the image processor 30. The analog-to-digital converter is configured to convert a signal generated by the camera module 40 into a digital image signal, and transmit the digital image signal to the image processor 30, then the image processor 30 processes the digital image signal, and finally the display 20 displays an image or a video.

In some embodiments, the electronic device 100 may further include a memory (not shown in the figure). The memory is communicatively connected to the image processor 30. After processing a digital image signal, the image processor 30 transmits an image to the memory, so that when an image needs to be viewed subsequently, the image can be found from the memory at any time and displayed on the display 20. In some embodiments, the image processor 30 further compresses a processed digital image signal, and then stores the compressed digital image signal in the memory to save memory space.

As shown in FIG. 2, in some embodiments, the camera module 40 includes a long-focus lens 1, a photosensitive element 2, and a light filter 3. The photosensitive element 2 is located on an image side of the long-focus lens 1. The camera module 40 may further include a circuit board (not shown in the figure). The photosensitive element 2 may be fastened on the circuit board. The light filter 3 may be located between the long-focus lens 1 and the photosensitive element 2. Rays can pass through the long-focus lens 1 to irradiate a photosensitive surface of the photosensitive element 2. For example, a working principle of the camera module 40 is as follows: Rays reflected by a shot object generate an optical image through the long-focus lens 1, and the optical image is projected to the photosensitive surface of the photosensitive element 2. The photosensitive element 2 converts the optical image into an electrical signal, in other words, an analog image signal, and transmits the electrical signal to an analog-to-digital converter, to convert the electrical signal into a digital image signal and send the digital image signal to the image processor 30.

The photosensitive element 2 (also referred to as an image sensor) is a semiconductor chip, includes hundreds of thousands to millions of photodiodes on a surface, and generates charges when being irradiated by light. The photosensitive element 2 may be a charge coupled device (charge coupled device, CCD), or may be a complementary metal-oxide semiconductor device (complementary metal-oxide semiconductor, CMOS). The charge coupled device is made of a highly photosensitive semiconductor material, and can convert rays into electric charges. The charge coupled device is constituted by many photosensitive units, usually in megapixels. When the surface of the charge coupled device is illuminated by rays, each photosensitive unit reflects electric charges on a component. Signals generated by all photosensitive units are combined to form a complete picture. The complementary metal-oxide semiconductor device is a semiconductor mainly made by using two elements: silicon and germanium, so that semiconductors of N (with negative electrons) and P (with positive electrons) levels coexist on the complementary metal-oxide semiconductor device. A current generated by these two complementary effects can be recorded and interpreted into an image by a processing chip.

The long-focus lens 1 performs imaging mainly by using a refraction principle of a lens. To be specific, object rays pass through the long-focus lens 1 and form a clear image on a focal plane, and the image of the object is recorded by using the photosensitive element 2 located on the focal plane.

The light filter 3 is configured to filter out an undesired band in the rays, and keep the photosensitive element 2 from generating false colors or ripples, to improve effective resolution and color reproduction of the photosensitive element 2. For example, the light filter 3 may be an infrared light filter. In this embodiment, the light filter 3 is an independent component. In some other embodiments, a light filter mechanical part may be removed, and instead, surface processing or material processing is performed on at least one optical element of the long-focus lens 1, to implement light filtering. A specific embodiment of a mechanical part or structure used for implementing light filtering is not strictly limited in this application.

The long-focus lens 1 may be an upright lens or a periscope lens. In this embodiment, an example in which the long-focus lens 1 is a periscope lens is used for description. When being a periscope lens, the long-focus lens 1 can be better used in a thin electronic device 100.

Figure 3:
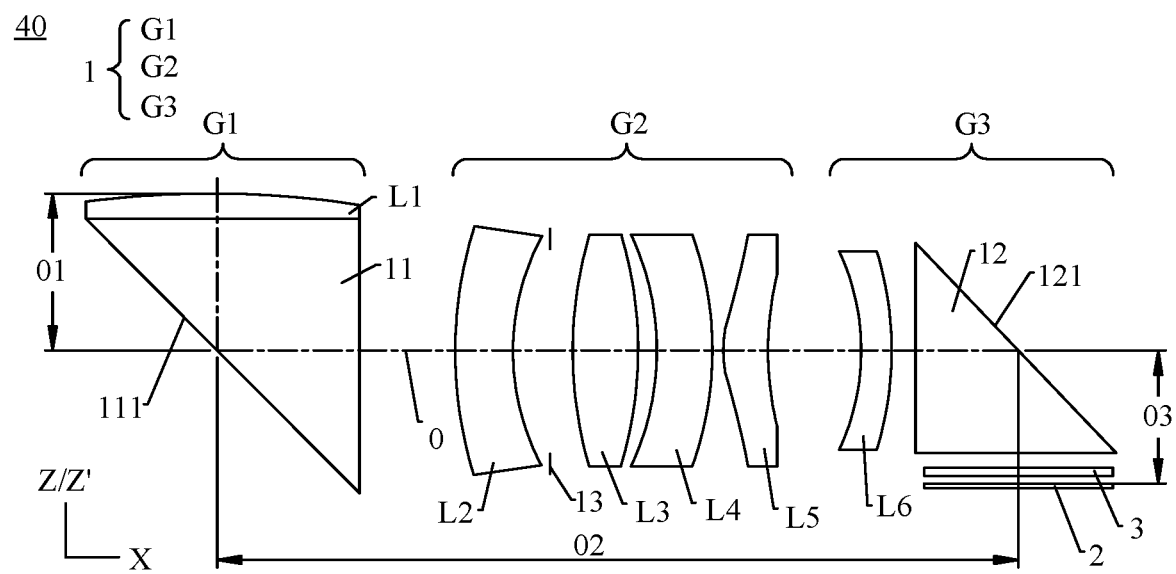
FIG. 3 is a schematic diagram of a partial structure of the camera module shown in FIG. 2 in some embodiments.
Figure 4:
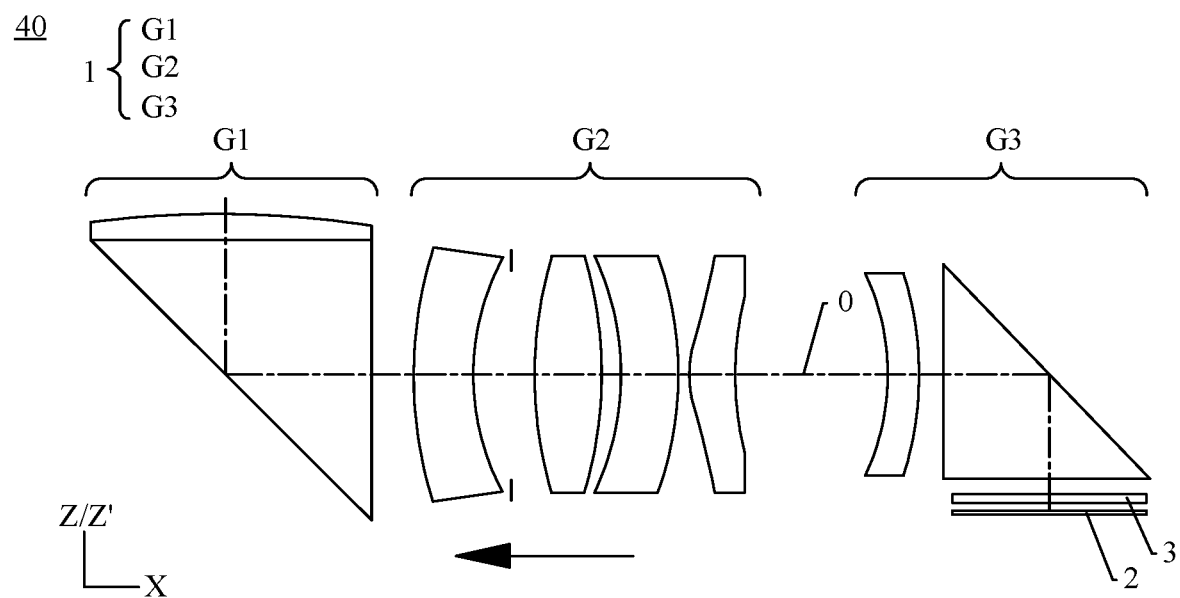
FIG. 4 is a schematic diagram of the camera module shown in FIG. 3 in some use states.

FIG. 3 is a schematic diagram of a partial structure of the camera module 40 shown in FIG. 2 in some embodiments. FIG. 4 is a schematic diagram of the camera module 40 shown in FIG. 3 in some use states.

In some embodiments, the long-focus lens 1 includes a first lens assembly G1, a second lens assembly G2, and a third lens assembly G3 that are arranged from an object side to the image side. The photosensitive element 2 of the camera module 40 is located on an image side of the third lens assembly G3. The first lens assembly G1 and the third lens assembly G3 are fixed lens assemblies, and the second lens assembly G2 is a focusing lens assembly. The camera module 40 shown in FIG. 3 is in a long-shot shooting mode, and the camera module 40 shown in FIG. 4 is in a close-up shooting mode. As shown in FIG. 3 and FIG. 4, in a focusing process in which the long-focus lens 1 is switched from a long shot to a close-up, the second lens assembly G2 moves toward the object side along an optical axis O, a combined focal length of the first lens assembly G1 and the second lens assembly G2 decreases, and a combined focal length of the second lens assembly G2 and the third lens assembly G3 decreases.

In this embodiment, when the second lens assembly G2 moves toward the object side, the combined focal length of the first lens assembly G1 and the second lens assembly G2 and the combined focal length of the second lens assembly G2 and the third lens assembly G3 both tend to decrease. The second lens assembly G2 may move by a small displacement to implement focusing. A focusing stroke of the second lens assembly G2 is small. This effectively suppresses aberration deterioration caused by focusing, so that the long-focus lens has a strong focusing capability, and the long-focus lens has high imaging quality and a strong macro capability. In addition, because the focusing stroke required by the long-focus lens 1 for focusing is small, a volume of a motor used to drive the second lens assembly G2 to move is also reduced, making it easier to implement miniaturization of the camera module 40.

There is a first safe distance between the first lens assembly G1 and the second lens assembly G2, and there is a second safe distance between the second lens assembly G2 and the third lens assembly G3, to ensure that no collision occurs between optical elements in the focusing process of the long-focus lens 1. Factors such as the focusing stroke, a camera lens support margin, and temperature impact need to be considered for the first safe distance.

In some embodiments, the first lens assembly G1 includes at least one lens, and the first lens assembly G1 has a positive focal power; the second lens assembly G2 includes at least one lens, and the second lens assembly G2 has a positive focal power; and the third lens assembly G3 includes at least one lens, and the third lens assembly G3 has a negative focal power.

According to the theory of applied optics, when two lens assemblies whose focal lengths are respectively Fa and Fb are arranged at an interval of d, a focal length F of a combined system meets $1/F=1/Fa+1/Fb-d/(Fa \times Fb)$. In this embodiment, because a focal length of the first lens assembly G1 is positive, and a focal length of the second lens assembly G2 is positive, when the second lens assembly G2 moves toward the object side, an interval between the first lens assembly G1 and the second lens assembly G2 decreases. In this case, the combined focal length of the first lens assembly G1 and the second lens assembly G2 decreases. Because the focal length of the second lens assembly G2 is positive, and a focal length of the third lens assembly G3 is negative, when the second lens assembly G2 moves toward the object side, an interval between the second lens assembly G2 and the third lens assembly G3 increases. In this case, the combined focal length of the second lens assembly G2 and the third lens assembly G3 decreases. Therefore, in this embodiment, when the second lens assembly G2 moves toward the object side, the combined focal length of the first lens assembly G1 and the second lens assembly G2 and the combined focal length of the second lens assembly G2 and the third lens assembly G3 both tend to decrease. The second lens assembly G2 may move by a small displacement to implement focusing. This effectively suppresses an aberration problem caused by focusing.

Figure 5A:
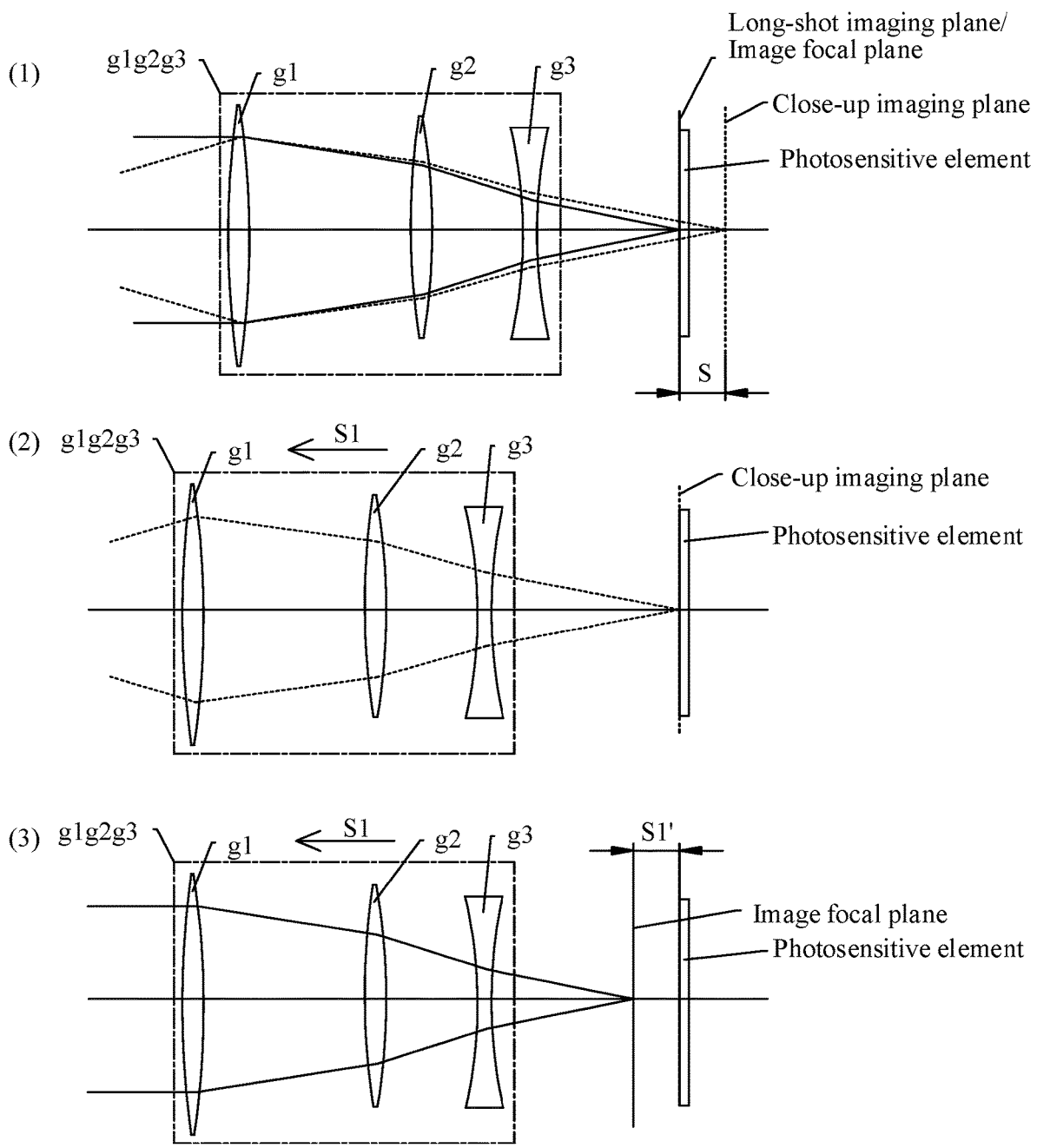
FIG. 5A is a schematic diagram of a focusing process of a long-focus lens.
Figure 5B:
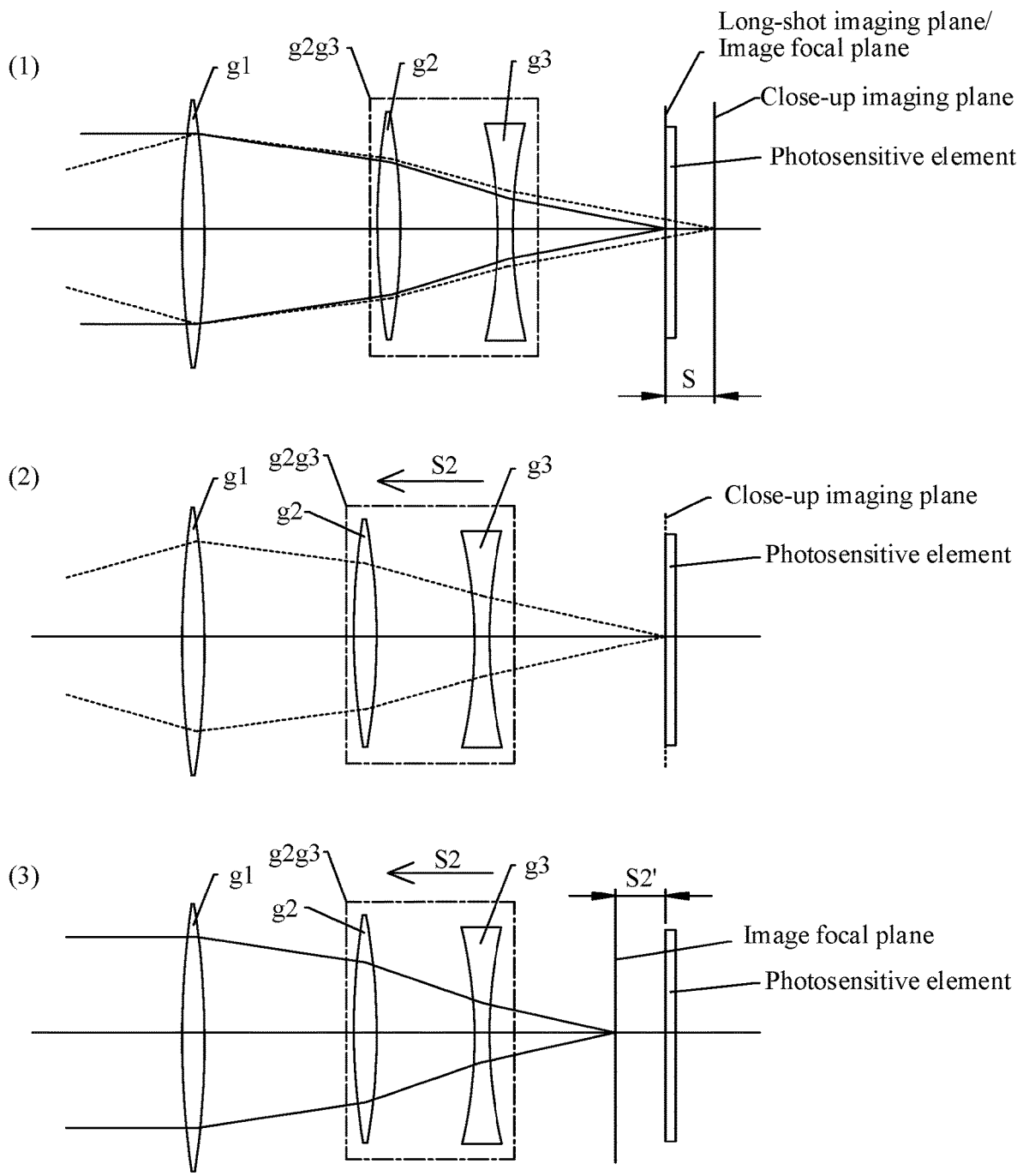
FIG. 5B is a schematic diagram of a focusing process of another long-focus lens.
Figure 5C:
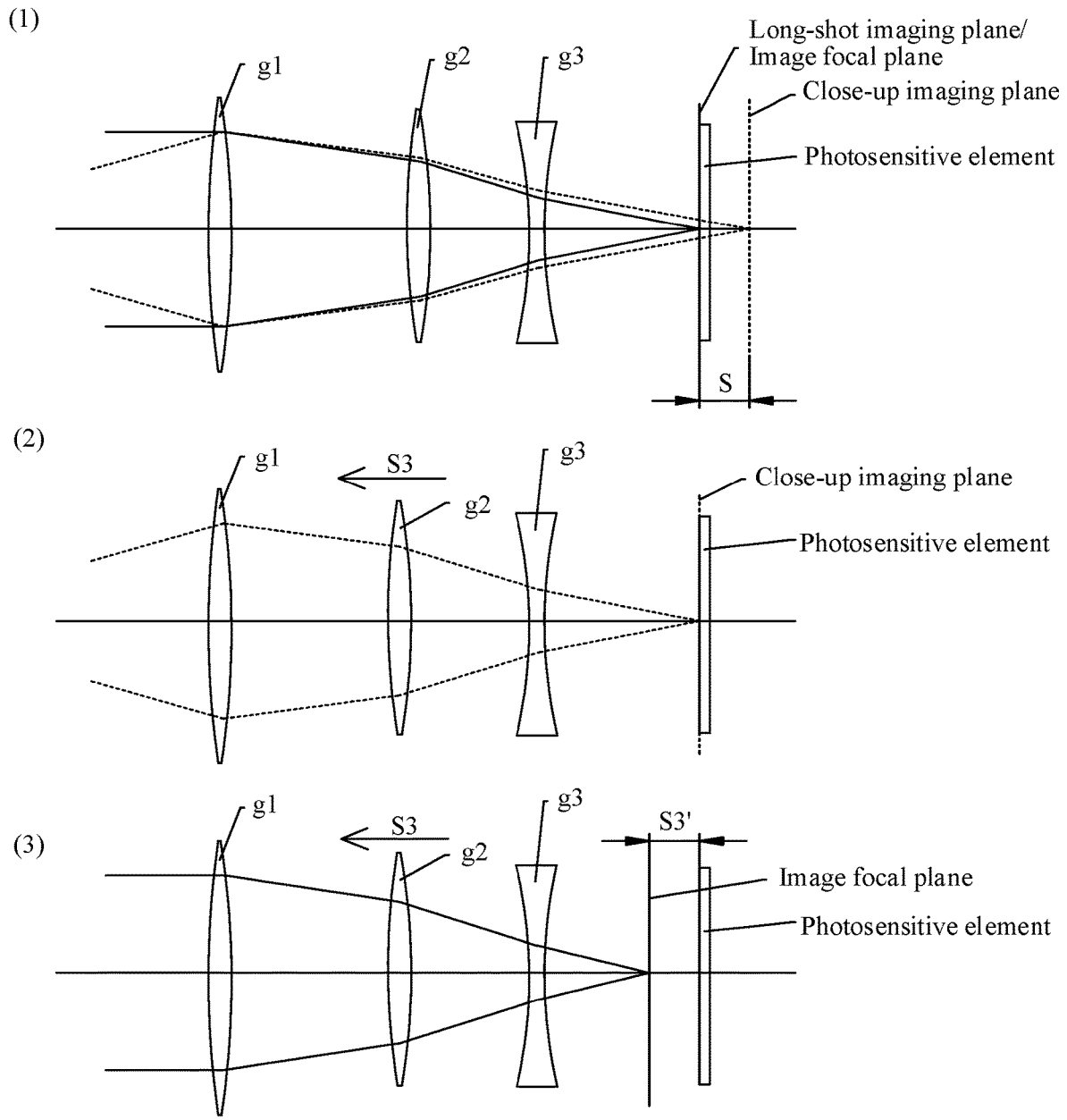
FIG. 5C is a schematic diagram of a focusing process of still another long-focus lens.

FIG. 5A is a schematic diagram of a focusing process of a long-focus lens. FIG. 5B is a schematic diagram of a focusing process of another long-focus lens. FIG. 5C is a schematic diagram of a focusing process of still another long-focus lens. FIG. 5A to FIG. 5C show a comparison of focusing processes of three long-focus lenses. For ease of comparison, three single lenses (g1, g2, and g3) with same parameters are used for the long-focus lenses in FIG. 5A to FIG. 5C. In FIG. 5A, the lens g1, the lens g2, and the lens g3 form a group g1g2g3. In the focusing process of the long-focus lens, the group g1g2g3 moves as a whole. In FIG. 5B, the lens g2 and the lens g3 form a group g2g3. In the focusing process of the long-focus lens, the lens g1 does not move, but the group g2g3 moves. In FIG. 5C, in the focusing process of the long-focus lens, neither of the lens g1 and the lens g3 moves, and the lens g2 moves. In practice, each lens (g1, g2, or g3) may be replaced with more lenses, so as to implement a better function.

As shown in (1) in FIG. 5A, when the long-focus lens focuses on a long shot, rays reflected by a long-shot object are imaged on a long-shot imaging plane after passing through the long-focus lens, the long-shot imaging plane falls on a photosensitive element, and the camera module can shoot a long-shot image. As shown in (2) in FIG. 5A, when the long-focus lens focuses on a close-up, the group g1g2g3 moves by S1 toward the object side (that is, a side away from the photosensitive element), rays reflected by a close-up object are imaged on a close-up imaging plane after passing through the long-focus lens, the close-up imaging plane falls on the photosensitive element, and the camera module can shoot a close-up image.

When (1) and (3) in FIG. 5A are compared, as shown in (1) in FIG. 5A, when the long-focus lens focuses on a long shot, an image focal plane of the long-focus lens falls on the photosensitive element, and there is a spacing S between the close-up imaging plane and the image focal plane. As shown in (3) in FIG. 5A, when the group g1g2g3 moves by S1 toward the object side to enable the long-focus lens to focus on a close-up, the image focal plane of the long-focus lens moves by S1' in front of the photosensitive element. In this solution, S1'=S, so that the close-up imaging plane can fall on the photosensitive element (as shown in (2) in FIG. 5A). Therefore, the camera module can clearly shoot a close-up image, and complete the focusing process of switching from a long shot to a close-up.

The moving distance S1 of the group g1g2g3 is the focusing stroke of the long-focus lens. In this solution, a position change of the image focal plane is implemented by moving the entire camera lens, and therefore S1=S1'. In this solution, approximate calculation is performed according to a paraxial optical formula: S1'=EFL×EFL/(Object distance+ EFL). The EFL is a focal length of the group g1g2g3, that is, a focal length of the long-focus lens. It can be learned from the formula that S1' is determined by only the EFL and the object distance, and cannot be increased or decreased. Therefore, the focusing stroke of the long-focus lens cannot be increased or decreased either.

As shown in (1) in FIG. 5B, when the long-focus lens focuses on a long shot, rays reflected by a long-shot object are imaged on a long-shot imaging plane after passing through the long-focus lens, the long-shot imaging plane falls on a photosensitive element, and the camera module can shoot a long-shot image. As shown in (2) in FIG. 5B, when the long-focus lens focuses on a close-up, the lens g1 does not move, the group g2g3 moves by S2 toward the object side (that is, a side away from the photosensitive element), rays reflected by a close-up object are imaged on a close-up imaging plane after passing through the long-focus lens, the close-up imaging plane falls on the photosensitive element, and the camera module can shoot a close-up image.

When (1) and (3) in FIG. 5B are compared, as shown in (1) in FIG. 5B, when the long-focus lens focuses on a long shot, an image focal plane of the long-focus lens falls on the photosensitive element, and there is a spacing S between the close-up imaging plane and the image focal plane. As shown in (3) in FIG. 5B, when the group g2g3 moves by S2 toward the object side to enable the long-focus lens to focus on a close-up, the image focal plane of the long-focus lens moves by S2' toward the front of the photosensitive element. In this solution, S2'=S, so that the close-up imaging plane can fall on the photosensitive element (as shown in (2) in FIG. 5B). Therefore, the camera module can clearly shoot a close-up image, and complete the focusing process of switching from a long shot to a close-up. Because the parameters of the lenses and the spacings between the lens in this solution are the same as those in the solution shown in FIG. 5A, the spacing S in this solution is equal to the spacing S in the solution shown in FIG. 5A, and the image focal plane displacement S2' in this solution is equal to the image focal plane displacement S1' in the solution shown in FIG. 5A.

The moving distance S2 of the group g2g3 is the focusing stroke of the long-focus lens. In this solution, the focusing process is essentially to shorten the focal length of the long-focus lens, so that the image focal plane moves by S2' toward the front of the photosensitive element, and the close-up imaging plane can fall on the photosensitive element. For ease of intuitive description, it may be assumed that, when the long-focus lens focuses on a long shot, a principal plane of the lens g1 coincides with a principal plane of the group g2g3, in other words, a paraxial equivalent distance between the lens g1 and the group g2g3 is 0, a focal length of the lens g1 is defined as F1, and a focal length of the group g2g3 is defined as F2. The combined focal length can be easily obtained from the theory of optics: EFL=F1×F2/(F1+F2−0). When the long-focus lens focuses on a close-up, the group g2g3 moves by S2 toward the object side, and a paraxial distance S2 (the distance decreases, and S2 is negative) is generated between the lens g1 and the group g2g3. In this case, the combined focal length is as follows: EFL'=F1×F2/(F1+F2−S2). If a focal length variation is approximately represented by the image focal plane displacement, S2'=F1×F2/(F1+F2)−F1×F2/(F1+F2−S2). Because of non-linear relationships between the parameters, the foregoing content is not strictly deduced according to an actual model. However, it is not difficult to learn that, when the long-focus lens is divided into two groups, different focusing strokes S2 are obtained by adjusting F1 and F2 at a fixed EFL and a fixed object distance in a case of the same image focal plane displacement S2'. Therefore, the applicant may set an appropriate range of F1 and an appropriate range of F2, so that the focusing stroke S2 is less than the image focal plane displacement S2'. Because S2'=S1'=S1, compared with the solution shown in FIG. 5A (the group g1g2g3 moves for focusing), in this solution (the lens g1 is fixed, and the group g2g3 moves for focusing), the appropriate range of F1 and the appropriate range of F2 may be set, so that the focusing stroke S2 is less than the focusing stroke S1, so as to shorten the focusing stroke and improve the focusing capability.

As shown in (1) in FIG. 5C, when the long-focus lens focuses on a long shot, rays reflected by a long-shot object are imaged on a long-shot imaging plane after passing through the long-focus lens, the long-shot imaging plane falls on a photosensitive element, and the camera module can shoot a long-shot image. As shown in (2) in FIG. 5C, when the long-focus lens focuses on a close-up, neither of the lens g1 and the lens g3 moves, the lens g2 moves by S3 toward the object side (that is, a side away from the photosensitive element), rays reflected by a close-up object are imaged on a close-up imaging plane after passing through the long-focus lens, the close-up imaging plane falls on the photosensitive element, and the camera module can shoot a close-up image.

When (1) and (3) in FIG. 5C are compared, as shown in (1) in FIG. 5C, when the long-focus lens focuses on a long shot, an image focal plane of the long-focus lens falls on the photosensitive element, and there is a spacing S between the close-up imaging plane and the image focal plane. As shown in (3) in FIG. 5C, when neither of the lens g1 and the lens g3 moves, and the lens g2 moves by S3 toward the object side to enable the long-focus lens to focus on a close-up, the image focal plane of the long-focus lens moves by S3' toward the front of the photosensitive element. In this solution, S3'=S, so that the close-up imaging plane can fall on the photosensitive element (as shown in (2) in FIG. 5C). Therefore, the camera module can clearly shoot a close-up image, and complete the focusing process of switching from a long shot to a close-up. Because the parameters of the lenses and the spacings between the lens in this solution are the same as those in the solution shown in FIG. 5B, the spacing S in this solution is equal to the spacing S in the solution shown in FIG. 5B, and the image focal plane displacement S3' in this solution is equal to the image focal plane displacement S2' in the solution shown in FIG. 5B.

The moving distance S3 of the lens g2 is the focusing stroke of the long-focus lens. In this solution, the focusing process is essentially to shorten the focal length of the long-focus lens, so that the image focal plane moves by S3' toward the front of the photosensitive element, and the close-up imaging plane can fall on the photosensitive element. Compared with (3) in FIG. 5B and (3) in FIG. 5C, in the focusing process, in the solution in FIG. 5B, a spacing between the lens g1 and the lens g2 decreases, and a spacing between the lens g2 and the lens g3 remains unchanged; and in the solution in FIG. 5C, the spacing between the lens g1 and the lens g2 decreases, and the spacing between the lens g2 and the lens g3 increases. To make a calculation process more intuitive, it is assumed that the focusing stroke S2 in the solution in FIG. 5B is equal to the focusing stroke S3 in the solution in FIG. 5C, and the spacing between the lens g1 and the lens g2 in the solution in FIG. 5B decreases by a same value as the spacing between the lens g1 and the lens g2 in the solution in FIG. 5C. In this case, the lens g1 and the lens g2 in the two solutions have a same optical feature (combined focal length). The lens g1 and the lens g2 in the solution in FIG. 5B are considered as a whole, and have a focal length F1'. The lens g1 and the lens g2 in the solution in FIG. 5C are considered as a whole, and have a same optical feature, and also have the focal length F1'. The lens g3 in the solution in FIG. 5B and the lens g3 in the solution in FIG. 5C have a same optical feature, and have a focal length F2'. In addition, when the group g2g3 in the solution in FIG. 5B moves by a distance D toward the image side, and the lens g2 in the solution in FIG. 5C moves by the distance D toward the image side, assuming that a paraxial equivalent distance between the whole formed by the lens g1 and the lens g2 in the solution in FIG. 5B and the lens g3 is 0, an entire group focal length in the solution in FIG. 5B is as follows: EFL'=F1'×F2'/(F1'+F2'−0). In the solution in FIG. 5C, a paraxial equivalent distance between the lens g3 and the whole formed by the lens g1 and the lens g2 is D (the distance increases, and D is positive). In the solution in FIG. 5C, the entire group focal length is as follows: EFL'=F1'× F2'/(F1'+F2'−D), the lens g1 and the lens g2 have positive focal powers, the lens g3 has a negative focal power, and F1'×F2'<0. An imaging condition of the camera module is that the entire group focal length EFL' is positive. Therefore, F1'+F2'<0, and F1'+F2'−d<0. Apparently, F1'×F2'/(F1'+F2') >F1'×F2'/(F1'+F2'−d). In other words, for a same moving distance D (that is, the focusing stroke), a decrease in a focal length that is generated when the group g2g3 in the solution in FIG. 5B moves is less than a decrease in a focal length that is generated when the lens g2 in the solution in FIG. 5C moves. Therefore, when the solution in FIG. 5B and the solution in FIG. 5C need to implement a same focal length variation (S3'=S2'), the moving distance S3 of the lens g2 in the solution in FIG. 5C is less than the moving displacement S2 of the group g2g3 in the solution in FIG. 5B. Therefore, compared with the solution in FIG. 5B, the solution in FIG. 5C can shorten the focusing stroke and improve the focusing capability.

With reference to FIG. 5A to FIG. 5C and the foregoing related descriptions, in the focusing process of the long-focus lens 1 (corresponding to the solution in FIG. 5C) in embodiments of this application, a focusing manner in which neither of the first lens assembly G1 and the third lens assembly G3 moves and the second lens assembly G2 moves is used, the focal lengths of the first lens assembly G1 and the second lens assembly G2 are set to be positive, and the focal length of the third lens assembly G3 is set to be negative. Therefore, in the focusing process in which the long-focus lens 1 is switched from a long shot to a close-up, the focusing stroke is less than a focusing stroke in a solution (corresponding to the solution in FIG. 5B) in which a camera lens includes a fixed lens assembly and a moving lens assembly and focusing is implemented by moving the moving lens assembly, and is also less than a focusing stroke in a solution (corresponding to the solution in FIG. 5A) in which an entire camera lens moves. The focusing stroke of the long-focus lens 1 is short, and the focusing capability is strong.

In summary, in this embodiment, in the long-focus lens 1, the focal lengths of the first lens assembly G1, the second lens assembly G2, and the third lens assembly G3 are appropriately configured, so that in a focusing process of the second lens assembly G2, focusing can be completed by using a small focusing stroke. The small focusing stroke can effectively suppress aberration deterioration caused by focusing, so that the long-focus lens 1 has a strong focusing capability, can shoot both a long shot and a close-up (for example, a macro scene), and has high imaging quality and high imaging definition. In addition, because the focusing stroke required by the long-focus lens 1 for focusing is small, a volume of a motor used to drive the second lens assembly G2 to move is also reduced, making it easier to implement miniaturization of the camera module 40.

In addition, the third lens assembly G3 is a lens assembly that is close to an imaging plane and that has a negative focal power, and therefore has functions of a flat-field mirror, and can compensate for a partial field curvature change caused by focusing, so that a focusing capability of the second lens assembly G2 is improved. Therefore, the long-focus lens 1 has a strong focusing capability, and imaging quality of the camera module 40 is higher.

In some embodiments, a focal length F2 of the second lens assembly G2 and an effective focal length EFL of the long-focus lens 1 meet 0.2<F2/EFL<1.9. In this embodiment, F2/EFL<1.9 is set, so that focusing can be implemented by moving the second lens assembly G2 by a small displacement, to reduce the focusing stroke and improve the focusing capability. 0.2<F2/EFL is set, to facilitate control of an aberration of a light beam passing through the second lens assembly G2, so that it is easier to perform aberration correction on the third lens assembly G3, and the long-focus lens 1 has better imaging quality. Therefore, a range of a ratio of the focal length F2 of the second lens assembly G2 to the effective focal length EFL of the long-focus lens 1 is appropriately designed, so that both the focusing capability and the imaging quality of the long-focus lens 1 can be considered.

In some embodiments, a focal length F3 of the third lens assembly G3 and the effective focal length EFL of the long-focus lens 1 meet −50<F3/EFL<−0.05. If F3/EFL is less than −50, a change in the spacing between the second lens assembly G2 and the third lens assembly G3 has no obvious impact on the effective focal length EFL of the long-focus lens 1, which is not conducive to balancing close-up image quality. If F3/EFL is greater than −0.05, the third lens assembly G3 has a strong negative focal power (a shape is more concave). Consequently, assembly of the third lens assembly makes assembly sensitivity higher, and assembly of the long-focus lens 1 is difficult. In this embodiment, a range of a ratio of the focal length F3 of the third lens assembly G3 to the effective focal length EFL of the long-focus lens 1 is appropriately designed, so that the long-focus lens 1 can reduce an image quality difference between long-shot shooting and close-up shooting with low assembly sensitivity, to obtain more uniform image quality. When the assembly sensitivity is low, a deviation (tolerance) range allowed during assembly of the long-focus lens 1 is larger, and assembly is easy.

In some embodiments, a focal length F1 of the first lens assembly G1 and the effective focal length EFL of the long-focus lens 1 meet 0.5<F1/EFL<50. In this embodiment, an aperture value of the long-focus lens 1 can be effectively reduced by setting F1/EFL<50, and a machining difficulty of the first lens assembly G1 is reduced by setting 0.5<F1/EFL, so that it is easy to machine the first lens assembly G1, in other words, processability of the first lens assembly G1 is good. Therefore, a range of a ratio of the focal length F1 of the first lens assembly G1 to the effective focal length EFL of the long-focus lens 1 is appropriately designed, so that both the aperture value of the long-focus lens 1 and the processability of the first lens assembly G1 can be considered.

It may be understood that the foregoing limitations on the ranges of the ratios of the focal length F1 of the first lens assembly G1, the focal length F2 of the second lens assembly G2, and the focal length F3 of the third lens assembly G3 to the effective focal length EFL of the long-focus lens 1 may exist independently, or may be combined with each other. When the foregoing three ratio ranges are combined with each other, the long-focus lens 1 can obtain a better aperture value, a better focusing capability, better imaging quality, and better processability. In some embodiments, the camera module 40 may implement long-shot shooting and implement macro shooting within 10 cm by using the long-focus lens 1.

In some embodiments, as shown in FIG. 3, the first lens assembly G1 may include a first reflection member 11 and a first lens L1. The first lens L1 has a positive focal power and is located on an object side of the first reflection member 11. The first lens L1 is configured to shrink a light beam. For example, the first lens L1 may be a convex lens. The first reflection member 11 changes a propagation direction of the optical axis O from a first direction Z to a second direction X, and the second direction X intersects the first direction Z. When the camera module 40 is mounted on the electronic device 100, the first direction Z may be parallel to a thickness direction of the electronic device 100, and the second direction X may be perpendicular to the first direction Z. For example, the second direction X may be parallel to a length direction or a width direction of the electronic device 100. In embodiments of this application, specific orientations of the first direction Z and the second direction X are not strictly limited.

In this embodiment, the long-focus lens 1 changes a propagation direction of rays by arranging the first reflection member 11 in the first lens assembly G1, so that propagation directions of a light beam in the second lens assembly G2 and the third lens assembly G3 may be different from a direction in which the light beam enters the electronic device 100, a placement position, an angle, space, and the like of the camera module 40 are more flexible, and the long-focus lens 1 can be used in a periscope camera module 40.

In addition, the light beam starts to shrink after passing through the first lens L1, and reaches the second lens assembly G2 after being reflected by the first reflection member 11. The light beam has already shrunk through a long optical path, and a diameter of the light beam is small. Therefore, the second lens assembly G2 and the third lens assembly G3 are no longer maximum limits of a clear aperture of the long-focus lens 1. Therefore, with a specific device thickness, even if sizes of the second lens assembly G2 and the third lens assembly G3 are limited by the device thickness, a clear aperture of the long-focus lens 1 can be effectively increased by arranging the first lens assembly G1 including the first lens L1 with a positive focal power and the first reflection member 11, to implement a wide aperture.

In addition, because the first lens L1 has a positive focal power, the first lens L1 shrinks a light beam, so that a diameter of a light beam entering the second lens assembly G2 is small, and apertures of the second lens assembly G2 and the third lens assembly G3 are no longer maximum limits on the clear aperture. Therefore, the clear aperture of the long-focus lens 1 can be effectively increased while a module size is considered, and the long-focus lens 1 has a small aperture value. In this embodiment, the aperture value of the long-focus lens 1 may be less than 2.8.

In some embodiments, a focal length f1 of the first lens L1 and the effective focal length EFL of the long-focus lens 1 meet 0.5<f1/EFL<50. In this embodiment, an aperture value of the long-focus lens 1 can be effectively reduced by setting f1/EFL<50, and a machining difficulty of the first lens L1 is reduced by setting 0.5<f1/EFL, so that it is easy to machine the first lens L1, in other words, processability of the first lens L1 is good. Therefore, a range of a ratio of the focal length f1 of the first lens L1 to the effective focal length EFL of the long-focus lens 1 is appropriately designed, so that both the aperture value of the long-focus lens 1 and the processability of the first lens L1 can be considered.

In some embodiments, when implementing reflection of rays, a reflective surface 111 of the first reflection member 11 may further correct an aberration such as astigmatism, to further improve image quality or reduce a volume. For example, as shown in FIG. 3, the reflective surface 111 of the first reflection member 11 may be a flat surface, to provide good machinability. In some other embodiments, the reflective surface 111 of the first reflection member 11 may be a spherical surface, a cylindrical surface, or a free curved surface. The spherical surface may be a convex surface or a concave surface. The cylindrical surface has curvature in one direction and extends in a straight line in the other direction. For example, a highly reflective film may be further disposed on the reflective surface 111 of the first reflection member 11, to improve reflection efficiency, so that an optical path enters a subsequent optical element after being fully reflected.

For example, the first reflection member 11 is a prism, and the prism includes a first surface, a second surface, and an oblique surface. The first surface of the prism is an object side surface, the second surface of the prism is an image side surface, and the oblique surface of the prism is the reflective surface 111. In some other embodiments, the first reflection member 11 may be a reflector. This is not strictly limited in embodiments of this application.

For example, the first lens L1 and the first reflection member 11 may be made of a same material, and the first lens L1 and the first reflection member 11 may be processed and molded by using a process such as injection molding, mold pressing, or polishing. For example, both the first lens L1 and the first reflection member 11 may be made of a glass material. In some other embodiments, a material of the first lens L1 may be different from that of the first reflection member 11. In some other embodiments, the first lens L1 and/or the first reflection member 11 may be made of a plastic material.

For example, a convex surface, for example, a spherical surface, may be provided at a paraxial axis of an object side surface of the first lens L1, which helps reduce a processing difficulty. A curvature radius R1 of the object side surface of the first lens L1 and a refractive index N1 of the first lens L1 meet R1/N1>4. In this embodiment, the curvature radius R1 of the object side surface of the first lens L1 is appropriate, so that machining is easy. The first lens L1 can ensure good image quality while reducing the aperture value. In some other embodiments, an aspheric surface may be provided at the paraxial axis of the object side surface of the first lens L1.

Both the first lens L1 and the first reflection member 11 are separately processed. An image side surface of the first lens L1 may be a flat surface, to be glued together with the first reflection member 11, so that the first lens assembly G1 can participate as a whole in a subsequent assembly process of the long-focus lens 1. In addition, an assembly structure of the first lens L1 and the first reflection member 11 is compact. This facilitates miniaturization of the camera module 40. In some other embodiments, the first lens L1 and the first reflection member 11 may be an integrated structure, in other words, may be an integrated special-shaped prism.

In some embodiments, the first lens assembly G1 includes a lens having a positive focal power, and an Abbe number of the lens is greater than 40. In other words, an Abbe number of the first lens L1 is greater than 40, to ensure that no excessively large residual chromatic aberration is generated, to reduce design difficulty of a lens assembly located on an image side of the first lens assembly. It may be understood that, in this embodiment, one lens is provided in the first lens assembly G1, and the first lens assembly G1 may further include a non-lens structure, for example, the first reflection member 11 and a planar mirror. This is not strictly limited in this embodiment.

In some other embodiments, the first lens assembly G1 may include at least two lenses, and the last lens that is of the first lens assembly G1 and that is closest to the image side is located on the object side or an image side of the first reflection member 11. When the last lens that is of the first lens assembly G1 and that is closest to the image side is located on the object side of the first reflection member 11, at least two lenses of the first lens assembly G1 are both located on the object side of the first reflection member 11. When the last lens that is of the first lens assembly G1 and that is closest to the image side is located on the image side of the first reflection member 11, some lenses of the first lens assembly G1 are located on the object side of the first reflection member 11, and some lenses are located on the image side of the first reflection member 11. When the lenses of the first lens assembly G1 are separately disposed on two sides of the first reflection member 11, space utilization of the first lens assembly G1 is high, and it is easy to arrange the lenses.

In some other embodiments, the first lens assembly G1 may further include at least one lens that has a negative focal power and that is located on an image side of the first reflection member 11. In this embodiment, the lens or the lens assembly located on the image side of the first reflection member 11 has a negative focal power, so that an incident angle of a light beam on the second lens assembly G2 can be reduced, to reduce a design difficulty of the second lens assembly G2, and achieve a better imaging effect.

In some other embodiments, the first lens assembly G1 may further include a lens that has a negative focal power and that is located on the object side of the first reflection member 11. The lens and the first lens L1 are used together to form a positive-negative lens cooperation structure, to better resolve aberration problems such as a chromatic aberration.

In some other embodiments, the first lens assembly G1 includes at least two lenses of different materials, to reduce an aberration. When a material of one lens in the first lens assembly G1 is different from that of the other lens, it may be considered that the first lens assembly G1 includes at least two lenses made of different materials. The two lenses of different materials may have different temperature characteristics, for example, coefficients of thermal expansion and temperature coefficients of light refractive index, to reduce impact of an ambient temperature. For example, the two lenses of different materials may be made of glass and plastic respectively.

In some embodiments, the second lens assembly G2 may include three to six lenses. For example, the $1^{st}$ lens that is of the second lens assembly G2 and that is closest to the object side may have a negative focal power. In this embodiment, the $1^{st}$ lens in the second lens assembly G2 can cooperate with the first lens L1 with a positive focal power, to resolve aberration problems such as a chromatic aberration.

In this embodiment, as shown in FIG. 3, an example in which the second lens assembly G2 includes four lenses is used for description. The second lens assembly G2 includes a second lens L2, a third lens L3, a fourth lens L4, and a fifth lens L5 that are arranged from the object side to the image side. For example, the second lens L2 has a negative focal power, and the second lens L2 is made of a resin material. A convex surface is provided at a paraxial axis of an object side surface of the second lens L2, and a concave surface is provided at a paraxial axis of an image side surface of the second lens L2, both being aspheric surfaces. The third lens L3 has a positive focal power, and the third lens L3 is made of a resin material. A convex surface is provided at a paraxial axis of an object side surface of the third lens L3, and a convex surface is provided at a paraxial axis of an image side surface of the third lens L3, both being aspheric surfaces.

In some embodiments, the second lens assembly G2 may include at least two lenses of different materials, to have different Abbe numbers. This reduces impact of a chromatic aberration on image quality. When a material of one lens in the second lens assembly G2 is different from that of the other lens, it may be considered that the second lens assembly G2 includes at least two lenses made of different materials. The two lenses of different materials may have different temperature characteristics, for example, coefficients of thermal expansion and temperature coefficients of light refractive index, to reduce impact of an ambient temperature. For example, the two lenses of different materials may be made of glass and plastic respectively.

In some other embodiments, when the first lens assembly G1 includes at least one lens that has a negative focal power and that is located on the image side of the first reflection member 11, the $1^{st}$ lens that is of the second lens assembly G2 and that is closest to the object side has a positive focal power. In this case, the light beam passing through the first lens assembly G1 can smoothly enter the second lens assembly G2, which helps improve the imaging quality of the long-focus lens 1.

In some embodiments, as shown in FIG. 3, the third lens assembly G3 includes a second reflection member 12, the second reflection member 12 changes the propagation direction of the optical axis O from the second direction X to a third direction Z', and the third direction Z' intersects the second direction X. The third direction Z' may be perpendicular to the second direction X. For example, the third direction Z' may be parallel to the first direction Z, to be parallel to the thickness direction of the electronic device 100. In embodiments of this application, a specific orientation of the third direction Z' is not strictly limited. For example, the second reflection member 12 may be a prism or a reflector.

In this embodiment, the optical axis O includes a first part O1 from the object side surface of the first lens L1 to the reflective surface 111 of the first reflection member 11, a second part O2 from the reflective surface 111 of the first reflection member 11 to a reflective surface 121 of the second reflection member 12, and a third part O3 from the reflective surface 121 of the second reflection member 12 to a photosensitive element. In a focusing process in which the long-focus lens 1 is switched from a long shot to a close-up, the first lens assembly G1 and neither of the third lens assembly G3 moves, and the second lens assembly G2 moves along the second part O2 of the optical axis O toward the first lens assembly G1, to implement focusing. Because none of the first part O1, the second part O2, and the third part 03 of the optical axis O changes in the focusing process, a thickness of an optical system of the long-focus lens 1 is a sum of a size of the first part O1 of the optical axis O and a size of the third part 03 of the optical axis O, and a focusing stroke of the long-focus lens 1 does not cause an increase in the thickness of the optical system. This facilitates miniaturization of the long-focus lens 1 and the camera module 40.

In some embodiments, the reflective surface 121 of the second reflection member 12 may be a flat surface, to provide good machinability. In some other embodiments, when implementing reflection of rays, the reflective surface 121 of the second reflection member 12 may further correct an aberration such as astigmatism, to further improve image quality or reduce a volume. For example, the reflective surface 121 of the second reflection member 12 may be a spherical surface, a cylindrical surface, or a free curved surface. The spherical surface may be a convex surface or a concave surface. The cylindrical surface has curvature in one direction and extends in a straight line in the other direction.

In some embodiments, as shown in FIG. 3, the third lens assembly G3 further includes a sixth lens L6 located on an object side of the second reflection member 12. In the direction of the optical axis O, rays pass through the first lens L1, are reflected by the first reflection member 11, pass through the second lens L2, the third lens L3, the fourth lens L4, the fifth lens L5, and the sixth lens L6 in sequence, are then reflected by the second reflection member 12, pass through the light filter 3, and finally reach the photosensitive element 2.

In this embodiment, because the first reflection member 11 and the second reflection member 12 are disposed in the long-focus lens 1, a target surface of the photosensitive element is parallel to the first lens L1, and a size of the target surface is not limited by a size in a thickness direction of the electronic device 100, to facilitate design of a large target surface of the camera module 40.

For example, the sixth lens L6 has a negative focal power, and is configured to compensate for image quality, to improve the imaging quality of the long-focus lens 1. The sixth lens L6 is made of a resin material, and the sixth lens L6 may be processed and molded by using an injection molding process. In some other embodiments, the sixth lens L6 may be made of a glass material.

A material of the sixth lens L6 may be different from a material of the second reflection member 12. The sixth lens L6 and the second reflection member 12 may be assembled by using an active alignment process (AA), to implement good assembly precision. The sixth lens L6 and the second reflection member 12 may be disposed independently of each other, in other words, the sixth lens L6 and the second reflection member 12 form an interval on the optical axis O. In some other embodiments, the sixth lens L6 and the second reflection member 12 may be fastened as an integrated structure in a manner of glue or the like. Alternatively, the sixth lens L6 and the second reflection member 12 may be an integrated structure, in other words, may be an integrated special-shaped prism.

In some other embodiments, the sixth lens L6 may be located on an image side of the third lens assembly G3. Alternatively, the third lens assembly G3 includes a plurality of lenses, and the plurality of lenses are all located on the object side or an image side of the second reflection member 12. Alternatively, the third lens assembly G3 includes a plurality of lenses, and the plurality of lenses are partially located on the object side of the second reflection member 12 and partially located on an image side of the second reflection member 12. In other words, the third lens assembly G3 includes at least one lens located on the object side or the image side of the second reflection member 12. Alternatively, the third lens assembly G3 includes at least one lens located on the object side of the second reflection member 12 and at least one lens located on the image side of the second reflection member 12. In this application, one or more lenses in the third lens assembly G3 may be arranged in a plurality of manners, to better adapt to an optical path requirement and an assembly requirement of the long-focus lens 1.

In some other embodiments, the third lens assembly G3 may include a second reflection member 12, the second reflection member 12 changes the propagation direction of the optical axis O from the second direction X to a third direction Z', and the third direction Z' intersects the second direction X. The third lens assembly G3 further includes at least one lens that has a negative focal power and that is located on an image side of the second reflection member 12. In this embodiment, the at least one lens having a negative focal power located on the image side of the second reflection member 12 can effectively compensate for image quality, and improve the imaging quality of the long-focus lens 1.

In some other embodiments, the third lens assembly G3 may include at least two lenses of different materials, to have different Abbe numbers. This reduces impact of a chromatic aberration on image quality. When a material of one lens in the third lens assembly G3 is different from that of the other lens, it may be considered that the third lens assembly G3 includes at least two lenses made of different materials. The two lenses of different materials may have different temperature characteristics, for example, coefficients of thermal expansion and temperature coefficients of light refractive index, to reduce impact of an ambient temperature. For example, the two lenses of different materials may be made of glass and plastic respectively.

In some other embodiments, the first lens assembly G1 includes the first reflection member 11, the third lens assembly G3 does not include a third reflection member, and a light beam enters the first lens assembly G1 in the first direction Z, is reflected by the first reflection member 11 to the second direction X, and is received by the photosensitive element 2 after passing through the second lens assembly G2 and the third lens assembly G3. In this embodiment, the second lens assembly G2 moves in the second direction X to implement focusing, and the long-focus lens 1 has a strong focusing capability. The optical axis O includes a first part O1 from the object side surface of the first lens assembly G1 to the reflective surface 111 of the first reflection member 11 and a second part O2 from the reflective surface 111 of the first reflection member 11 to the photosensitive element 2. Because neither of the first part O1 and the second part O2 of the optical axis O changes in the focusing process, thicknesses of the long-focus lens 1 and the camera module 40 are mainly affected by the first part O1 of the optical axis O, and lengths are mainly affected by the second part O2 of the optical axis O. Therefore, miniaturization of the long-focus lens 1 and the camera module 40 is facilitated. In some other embodiments, the first lens assembly G1 does not include the first reflection member 11, the third lens assembly G3 does not include the third reflection member, and the long-focus lens 1 is a telescope lens.

In some embodiments, an optical surface of at least one lens of the long-focus lens 1 is an aspheric surface, and an optical surface of the aspheric surface has different focal lengths from a paraxial area to an outer field of view area, so that an imaged picture has more balanced image quality, and/or an optical surface of at least one lens of the long-focus lens 1 may be a free curved surface, to correct an aberration. The aspheric surface is a surface that is rotationally symmetric around the optical axis O. The free curved surface may have no symmetry axis, or may be symmetric in one direction, or may be symmetric in two directions.

In some embodiments, the plurality of lenses of the long-focus lens 1 are assembled by using an active alignment (active alignment, AA) process, to ensure assembly precision.

In some embodiments, as shown in FIG. 3, the long-focus lens 1 further includes an aperture diaphragm 13, and the aperture diaphragm 13 is mounted on the second lens assembly G2. In this case, an aperture adjustment effect of the aperture diaphragm 13 is better, and the imaging quality of the long-focus lens 1 can be improved. For example, the aperture diaphragm 13 may be mounted in the middle of the second lens assembly G2. In this embodiment, an example in which the aperture diaphragm 13 is mounted between the second lens L2 and the third lens L3 is used for description. In some other embodiments, the aperture diaphragm 13 may alternatively be mounted in another position of the first lens assembly G1, the third lens assembly G3, or the long-focus lens 1. This is not strictly limited in embodiments of this application.

The aperture diaphragm 13 may be an isolated ring structure or a variable blade structure; or the aperture diaphragm 13 may be implemented by using a surface spraying process, for example, the aperture diaphragm 13 is formed by spraying a light shielding material on a lens. A position of the aperture diaphragm 13 may be fixed or may be variable. For example, the position of the aperture diaphragm 13 is variable, and the aperture diaphragm 13 may be adjusted based on a focusing case, to be located between different lenses.

In some embodiments, an optical surface of at least one lens of the long-focus lens 1 may form a diffraction grating structure. In this embodiment, the diffraction grating structure is appropriately disposed, so that a chromatic aberration can be reduced, and a volume of the long-focus lens 1 can be reduced.

In some embodiments, the long-focus lens 1 may further include a liquid lens, and the liquid lens is located between the first lens assembly G1 and the second lens assembly G2. In this embodiment, a focus adjustment effect can be enhanced by using a liquid lens, to implement ultra-macro shooting. The liquid lens is a mechanical part that uses a liquid as a lens and changes a focal length by changing a curvature of the liquid.

In some embodiments, a special-shape technology may be used for at least one lens of the long-focus lens 1, to reduce the size of the long-focus lens 1. For example, at least one lens in the second lens assembly G2 and/or the third lens assembly G3 may have a notch used to reduce a height of the lens. The notch may be implemented through an I-CUT process. The notch used to reduce the height of the lens is provided in the at least one lens in the second lens assembly G2 and/or the third lens assembly G3, so that a size of the long-focus lens 1 in a height direction can be effectively reduced, and the long-focus lens 1 can be better applicable to a miniaturized electronic device 100, and an application scope of the long-focus lens 1 is expanded. In addition, because a height of the lens decreases in a notch manner, a large clear aperture may be set for the lens, so that an amount of light admitted through the long-focus lens 1 is increased, and imaging quality of the long-focus lens 1 is better. When the lens in the second lens assembly G2 and/or the lens in the third lens assembly G3 are/is provided with a notch structure, notch proportions/a notch proportion of the lens in the second lens assembly G2 and/or the lens in the third lens assembly G3 can be increased by setting a focal length F1 of the first lens assembly G1 and an effective focal length EFL of the long-focus lens 1 to meet F1/EFL<50. Alternatively, a special-shape technology may be used on a structural support of a lens such as a lens tube or a partition, to reduce the size of the long-focus lens 1.

In some embodiments, a peripheral side surface or a supporting surface of at least one lens of the long-focus lens 1 may be blackened or roughened, to eliminate stray light and improve imaging quality. The blackening may be to coat or plate black ink or another extinction material, or may be to bond a film. The roughening is mainly used to increase roughness. Certainly, in some other embodiments, the long-focus lens 1 may eliminate stray light in another manner. This is not strictly limited in embodiments of this application.

In some embodiments, the camera module 40 further includes a light filter 3, the light filter 3 is located between the second reflection member 12 and the photosensitive element 2, and the light filter 3 is configured to filter out an undesired optical signal.

In some embodiments, the photosensitive element 2 may move on a plane perpendicular to the third direction Z' or tilt relative to the third direction Z', to implement image stabilization. In this case, the photosensitive element 2 does not have a motion capability in the third direction Z', or has a weak stroke that is far less than a focusing stroke, to reduce a thickness of the module. In some other embodiments, the photosensitive element 2 may be a fixed component.

With reference to data and a simulation result, the following presents a specific solution of the long-focus lens 1 shown in FIG. 3 in a possible embodiment.

Referring to Table 1a to Table 1c together, Table 1a shows a curvature radius, an interval, a refractive index (Nd), and a dispersion coefficient of each lens and the light filter 3 when the long-focus lens 1 shown in FIG. 3 focuses on a long shot in a possible embodiment. An interval includes a thickness of a lens and a spacing between lenses. The dispersion coefficient is the Abbe number. Table 1b and Table 1c show aspheric coefficients of the lenses of the long-focus lens 1 shown in FIG. 3 in a possible embodiment.

TABLE 1a

| Surface number | Description | Surface type | Curvature radius | Interval | Refractive index | Dispersion coefficient |
|---|---|---|---|---|---|---|
| S1 | L1 | Spherical surface | 23 | 0.71 | 1.803 | 46.8 |
| S2 | L1 | Flat surface | Infinite | 0 | | |
| S3 | First reflection member | Flat surface | | 3.39 | | |
| S4 | First reflection member | Reflective surface | Infinite | 4.1 | 1.803 | 46.8 |
| S5 | First reflection member | Flat surface | Infinite | 2.55 (variable) | | |
| S6 | L2 | Aspherical surface | 6.498 | 1.6 | 1.64 | 23.5 |
| S7 | L2 | Aspheric surface | 3.7893 | 1.2028 | | |
| STO | Aperture diaphragm | Flat surface | Infinite | 0.3867 | | |
| S8 | L3 | Aspheric surface | 6.6487 | 1.7743 | 1.54 | 56 |
| S9 | L3 | Aspheric surface | −26.0049 | 0.5212 | | |
| S10 | L4 | Aspheric surface | −4.3218 | 1.499 | 1.64 | 23.5 |
| S11 | L4 | Aspheric surface | −7.1219 | 0.283 | | |
| S12 | L5 | Aspheric surface | 3.7112 | 1.2301 | 1.54 | 56 |
| S13 | L5 | Aspheric surface | 6.0108 | 2.5528 (variable) | | |
| S14 | L6 | Aspheric surface | −3.842 | 0.8 | 1.54 | 56 |
| S15 | L6 | Aspheric surface | −5.5494 | 0.6 | | |
| S16 | Second reflection member | Flat surface | Infinite | 2.8 | 1.74 | 28.6 |
| S17 | Second reflection member | Reflective surface | Infinite | 2.8 | | |
| S18 | Second reflection member | Flat surface | Infinite | 0.3588 | | |
| S19 | Light filter | Flat surface | Infinite | 0.21 | 1.52 | 64.2 |
| S20 | Light filter | Flat surface | Infinite | 0.111 | | |
| S2 | Imaging plane | | | | | |

TABLE 1b

| Surface number | K | A4 | A6 | A8 | A10 |
|---|---|---|---|---|---|
| S6 | 0 | −3.086857E−03 | −6.569246E−05 | 2.184781E−06 | −1.471867E−07 |
| S7 | 0 | −7.140496E−03 | −2.996009E−04 | 6.310204E−06 | 7.046764E−07 |
| S8 | 0 | −2.427662E−03 | −2.763494E−04 | −7.509633E−05 | 1.487742E−05 |
| S9 | 0 | −2.427662E−03 | −2.763494E−04 | −7.509633E−05 | 1.487742E−05 |
| S10 | 0 | 2.081017E−02 | −3.902594E−03 | −2.712081E−04 | 2.652949E−04 |
| S11 | 0 | 9.282729E−03 | −3.647184E−03 | 8.174914E−04 | −9.539693E−05 |

TABLE 1b-continued

| Surface number | K | A4 | A6 | A8 | A10 |
|---|---|---|---|---|---|
| S12 | 0 | −7.813879E−03 | −2.605752E−03 | 7.382689E−04 | −1.117228E−04 |
| S13 | 0 | −4.812353E−03 | −7.875984E−04 | 1.494750E−04 | −1.786515E−05 |
| S14 | 0 | 1.093028E−02 | −4.441673E−04 | 2.294907E−05 | |
| S15 | 0 | 7.829013E−03 | −1.427205E−04 | −3.922251E−05 | 7.365571E−06 |

TABLE 1c

| Surface number | A12 | A14 | A16 |
|---|---|---|---|
| S6 | 1.577591E−08 | | |
| S7 | −1.414221E−08 | | |
| S8 | −6.502968E−07 | 8.428151E−09 | |
| S9 | −6.502968E−07 | 8.428151E−09 | |
| S10 | −4.562928E−05 | 3.378032E−06 | −9.479117E−08 |
| S11 | 5.428329E−06 | −1.089878E−07 | 0.000000E+00 |
| S12 | 8.572041E−06 | −2.523950E−07 | |
| S13 | 1.223210E−06 | −2.568614E−08 | |
| S14 | | | |
| S15 | −5.380069E−07 | 1.446087E−08 | |

The aspheric surface of the long-focus lens 1 in Table 1a may be defined by using, but not limited to, the following aspheric curve equation:

$$z = \frac{cr^2}{1 + \sqrt{1 - (1+k)c^2 r^2}} + \sum_{i=1}^{N} \alpha_i r^{2i}$$

Herein, z is a relative distance between a point that is on the aspheric surface and that is at a distance of r from the optical axis and an intersecting tangent plane tangent to the optical axis of the aspheric surface; r is a vertical distance between the point on the aspheric curve and the optical axis; c is a curvature; k is a cone coefficient; and $\alpha_i$ is an $i^{th}$-order aspheric coefficient. For details, refer to Table 1b and Table 1c.

Table 1d and Table 1e show basic parameters of the long-focus lens 1 shown in FIG. 3 in a possible embodiment. Herein, f1 to f6 in Table 1d are respectively focal lengths of the first lens L1 to the sixth lens L6 respectively, and F1 to F3 in Table 1e are focal lengths of the first lens assembly G1 to the third lens assembly G3 respectively.

TABLE 1d

| Parameter (mm) | ImgH | EFL | f1 | f2 | f3 | f4 | f5 | f6 | Aperture value |
|---|---|---|---|---|---|---|---|---|---|
| Value | 4.1 | 16.85 | 51.54 | −18.34 | 9.96 | −21.57 | 15.07 | −27.59 | 1.79 |

TABLE 1e

| Parameter (mm) | F1 | F2 | F3 | Thickness (O1 + O3) | TTL (O1 + O2 + O3) | F1/EFL | F2/EFL |
|---|---|---|---|---|---|---|---|
| Value | 51.54 | 15 | −27.59 | 7.58 | 29.48 | 3.06 | 0.89 |

In this embodiment, the aperture value of the long-focus lens 1 is 1.79. When the long-focus lens 1 is switched from a long shot to a close-up, for example, switched to focus at a macro distance of 9.5 cm, a focusing stroke of the second lens assembly G2 is 2.22 mm, and is clearly shorter than a focusing stroke (which generally needs to be greater than 4 mm) of a conventional lens. When the long-focus lens 1 focuses on a long shot, a combined focal length of the first lens assembly G1 and the second lens assembly G2 is 12.67 mm, a combined focal length of the second lens assembly G2 and the third lens assembly G3 is 27.23 mm, and an effective focal length of the long-focus lens 1 is 16.85 mm. When the long-focus lens 1 focuses on a close-up, the combined focal length of the first lens assembly G1 and the second lens assembly G2 is 12.76 mm, the combined focal length of the second lens assembly G2 and the third lens assembly G3 is 23.76 mm, and the effective focal length of the long-focus lens 1 is 12.6 mm. Therefore, in a focusing process in which the long-focus lens 1 is switched from a long shot to a close-up, the second lens assembly G2 moves to an object side, the focusing stroke is short, and a focusing capability is strong. The combined focal length of the first lens assembly G1 and the second lens assembly G2, the combined focal length of the second lens assembly G2 and the third lens assembly G3, and the effective focal length of the long-focus lens 1 are all reduced.

Figure 6:
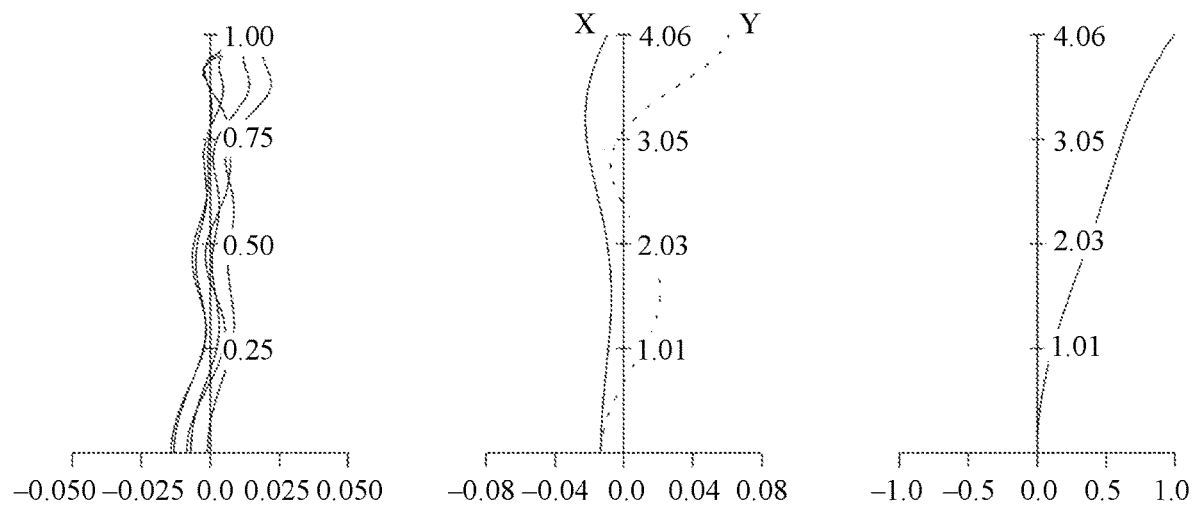
FIG. 6 is a diagram of a simulation effect of the long-focus lens shown in FIG. 3 in a possible embodiment.

FIG. 6 is a diagram of a simulation effect of the long-focus lens 1 shown in FIG. 3 in a possible embodiment.

FIG. 6 includes an axial chromatic aberration curve diagram, an astigmatic curvature of field diagram, and a distortion diagram of the long-focus lens 1. The axial chromatic aberration curve diagram includes spherical aberration curves of different bands corresponding to a system (the figure includes 650 nm, 610 nm, 555 nm, 510 nm, and 470 nm). A physical meaning of the curves is a deviation of light of a corresponding wavelength emitted from a 0-degree field of view from an ideal image point after passing through the optical system. A horizontal coordinate of the curve diagram is a deviation value along the optical axis, and a vertical coordinate of the curve diagram is a normalized coordinate at a pupil. The values shown in FIG. 6 are all small, and an axial aberration (a spherical aberration, a chromatic aberration, or the like) of the long-focus lens 1 is well corrected. The astigmatic field curvature diagram is used to show deviations between convergence points of pencils in different fields of view and an ideal imaging plane. X is a beam in a sagittal direction, and Y is a beam in a meridian direction. A horizontal coordinate of the curve diagram is a deviation value along the optical axis, and a vertical coordinate of the curve diagram is a corresponding field of view. When a value of a field of view is excessively large, image quality of the field of view is poor or a high-level aberration exists. As shown in FIG. 6, field curvatures are small in both directions, and the system has a good focal depth. The distortion diagram is used to represent relative deviations of beam convergence points (actual image heights) from an ideal image height in different fields of view. FIG. 6 shows that the relative deviations are all within 1%. This may ensure that there is no clear deformation.

Figure 7:
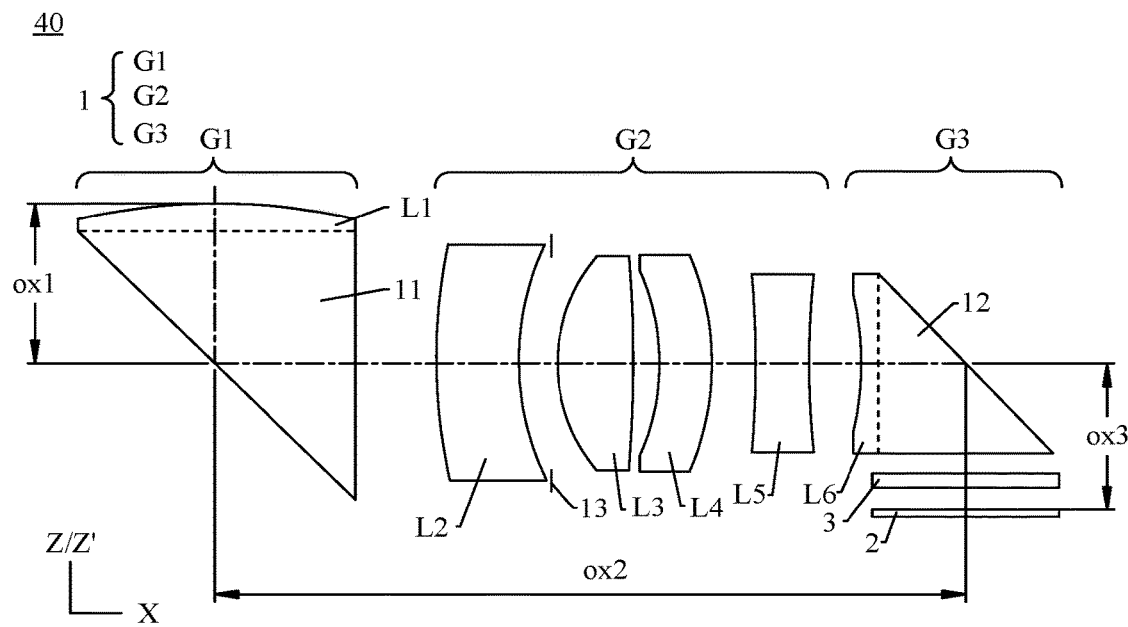
FIG. 7 is a schematic diagram of a partial structure of the camera module shown in FIG. 2 in some other embodiments.

FIG. 7 is a schematic diagram of a partial structure of the camera module 40 shown in FIG. 2 in some other embodiments. The camera module 40 shown in FIG. 7 includes most technical features of the camera module 40 shown in FIG. 3. The following mainly describes differences between the two, and most content that is the same between the two is not described again.

In some embodiments, the camera module 40 includes a long-focus lens 1, a light filter 3, and a photosensitive element 2. The long-focus lens 1 includes a first lens assembly G1, a second lens assembly G2, and a third lens assembly G3 that are arranged from an object side to an image side. The first lens assembly G1 and the third lens assembly G3 are fixed lens assemblies. In a focusing process in which the long-focus lens 1 is switched from a long shot to a close-up, the second lens assembly G2 moves toward the object side along an optical axis O.

The first lens assembly G1 includes a first lens L1 and a first reflection member 11. The first lens L1 and the first reflection member 11 of the first lens assembly G1 are an integrated structure. The first lens L1 and the first reflection member 11 are made of a same material, and may be processed and molded by using a process such as injection molding, mold pressing, or polishing. In some other embodiments, the first lens L1 and the first reflection member 11 may be separately formed and then assembled to form an integrated structure.

The second lens assembly G2 includes a second lens L2, a third lens L3, a fourth lens L4, and a fifth lens L5 that are arranged from the object side to the image side.

The third lens assembly G3 includes a sixth lens L6 and a second reflection member 12. The sixth lens L6 and the second reflection member 12 are an integrated structure. The sixth lens L6 and the second reflection member 12 are made of a same material, and may be processed and molded by using a process such as injection molding, mold pressing, or polishing. In some other embodiments, the sixth lens L6 and the second reflection member 12 may be separately formed and then assembled to form an integrated structure. For example, the sixth lens L6 may be made of a glass material.

The optical axis O includes a first part O1 from the object side surface of the first lens L1 to the reflective surface 111 of the first reflection member 11, a second part O2 from the reflective surface 111 of the first reflection member 11 to a reflective surface 121 of the second reflection member 12, and a third part O3 from the reflective surface 121 of the second reflection member 12 to a photosensitive element 2.

With reference to data and a simulation result, the following presents a specific solution of the long-focus lens 1 shown in FIG. 7 in a possible embodiment.

Referring to Table 2a to Table 2b together, Table 2a shows a curvature radius, an interval, a refractive index (Nd), and a dispersion coefficient of each lens and the light filter 3 when the long-focus lens 1 shown in FIG. 7 focuses on a long shot in a possible embodiment. An interval includes a thickness of a lens and a spacing between lenses. The dispersion coefficient is the Abbe number. Table 2b shows aspheric coefficients of the lenses of the long-focus lens 1 shown in FIG. 7 in a possible embodiment.

TABLE 2a

| Surface number | Description | Surface type | Curvature radius | Thickness | Refractive index | Dispersion coefficient |
|---|---|---|---|---|---|---|
| S1 | L1 | Spherical surface | 17.7033 | 4.1 | 1.544 | 55.6 |
| S2 | First reflection member | Reflective surface | Infinite | 4.1 | 1.544 | 55.6 |
| S3 | First reflection member | Flat surface | Infinite | 2.0833 (variable) | | |
| S4 | L2 | Aspheric surface | 10.596 | 2 | 1.639 | 23.5 |
| S5 | L2 | Aspheric surface | 5.003 | 0.6048 | | |
| STO | Aperture diaphragm | Flat surface | Infinite | 0.3789 | | |
| S6 | L3 | Aspheric surface | 4.1949 | 1.8609 | 1.544 | 55.6 |
| S7 | L3 | Aspheric surface | −93.7183 | 0.5644 | | |
| S8 | L4 | Aspheric surface | −7.259 | 1.3717 | 1.639 | 23.5 |
| S9 | L4 | Aspheric surface | −7.001 | 1.0031 | | |
| S10 | L5 | Aspheric surface | 12.3044 | 1.3283 | 1.544 | 55.6 |
| S11 | L5 | Aspheric surface | 8.2112 | 1.2897 (variable) | | |
| S12 | L6 | Spherical surface | −9.3046 | 3.2 | 1.74 | 28.6 |
| S13 | Second reflection member | Reflective surface | | 2.8 | 1.74 | 28.6 |
| S14 | Second reflection member | Flat surface | | 0.2 | | |

TABLE 2a-continued

| Surface number | Description | Surface type | Curvature radius | Thickness | Refractive index | Dispersion coefficient |
|---|---|---|---|---|---|---|
| S15 | Light filter | Flat surface | | 0.21 | 1.52 | 64.2 |
| S16 | Light filter | Flat surface | | 0.3167 | | |
| S17 | Imaging plane | Flat surface | | | | |

TABLE 2b

| Surface number | K | A4 | A6 | A8 | A10 | A12 |
|---|---|---|---|---|---|---|
| S4  | 0 | −1.317058E−03 | −4.888522E−05 |  3.747733E−07 |  4.022166E−08 | −7.158034E−09 |
| S5  | 0 | −2.597209E−03 | −1.420405E−04 |  8.774383E−08 |  5.490438E−07 | −7.200931E−08 |
| S6  | 0 | −5.458517E−04 | −1.003637E−05 |  1.294163E−06 |  1.266212E−07 |  1.217158E−08 |
| S7  | 0 | −2.009456E−03 | −2.525067E−05 | −6.349402E−06 |  1.146778E−07 |  9.573459E−08 |
| S8  | 0 | −6.337364E−04 | −2.428101E−04 | −5.266427E−06 |  7.035851E−07 |  1.652165E−07 |
| S9  | 0 | −1.263295E−03 |  1.810064E−04 | −2.887856E−05 |  1.672388E−06 |  2.108518E−08 |
| S10 | 0 | −1.410126E−02 |  3.777418E−05 | −2.955491E−06 | −5.550757E−06 |  2.172836E−07 |
| S11 | 0 | −1.154577E−02 |  3.071930E−04 |  1.358399E−05 | −3.060037E−06 |  1.847912E−07 |

The aspheric surface of the long-focus lens 1 in Table 2a may be defined by using, but not limited to, the following aspheric curve equation:

$$z = \frac{cr^2}{1+\sqrt{1-(1+k)c^2r^2}} + \sum_{i=1}^{N}\alpha_i r^{2i}$$

Herein, z is a relative distance between a point that is on the aspheric surface and that is at a distance of r from the optical axis and an intersecting tangent plane tangent to the optical axis of the aspheric surface; r is a vertical distance between the point on the aspheric curve and the optical axis; c is a curvature; k is a cone coefficient; and $\alpha_i$ is an $i^{th}$-order aspheric coefficient. For details, refer to Table 2b.

Table 2c and Table 2d show basic parameters of the long-focus lens 1 shown in FIG. 7 in a possible embodiment. Herein, f1 to f6 in Table 2c are respectively focal lengths of the first lens L1 to the sixth lens L6 respectively, and F1 to F3 in Table 2d are focal lengths of the first lens assembly G1 to the third lens assembly G3 respectively.

TABLE 2c

| Parameter (mm) | ImgH | EFL | f1 | f2 | f3 | f4 | f5 | f6 | Aperture value |
|---|---|---|---|---|---|---|---|---|---|
| Value | 4.1 | 16.85 | 50.1 | −17.1 | 7.4 | 99.1 | −51.04 | −12.49 | 2.6 |

TABLE 2d

| Parameter (mm) | F1 | F2 | F3 | Thickness (O1 + O3) | TTL (O1 + O2 + O3) | F1/EFL | F2/EFL |
|---|---|---|---|---|---|---|---|
| Value | 50.1 | 14.95 | −12.49 | 7.63 | 27.4 | 2.97 | 0.89 |

In this embodiment, the aperture value of the long-focus lens 1 is 2.6. When the long-focus lens 1 is switched from a long shot to a close-up, for example, switched to focus on a close-up at 50 cm, a focusing stroke of the second lens assembly G2 is 0.36 mm, and is clearly shorter than a focusing stroke (which generally needs to be greater than 0.65 mm) of a conventional lens. When the long-focus lens 1 focuses on a long shot, a combined focal length of the first lens assembly G1 and the second lens assembly G2 is 12.698 mm, a combined focal length of the second lens assembly G2 and the third lens assembly G3 is 52.48 mm, and an effective focal length of the long-focus lens 1 is 16.85 mm. When the long-focus lens 1 focuses on a close-up, the combined focal length of the first lens assembly G1 and the second lens assembly G2 is 12.579 mm, the combined focal length of the second lens assembly G2 and the third lens assembly G3 is 47.66 mm, and the effective focal length of the long-focus lens 1 is 16.17 mm. Therefore, in a focusing process in which the long-focus lens 1 is switched from a long shot to a close-up, the second lens assembly G2 moves to an object side, the focusing stroke is short, and a focusing capability is strong. The combined focal length of the first lens assembly G1 and the second lens assembly G2, the combined focal length of the second lens assembly G2 and the third lens assembly G3, and the effective focal length of the long-focus lens 1 are all reduced.

Figure 8:
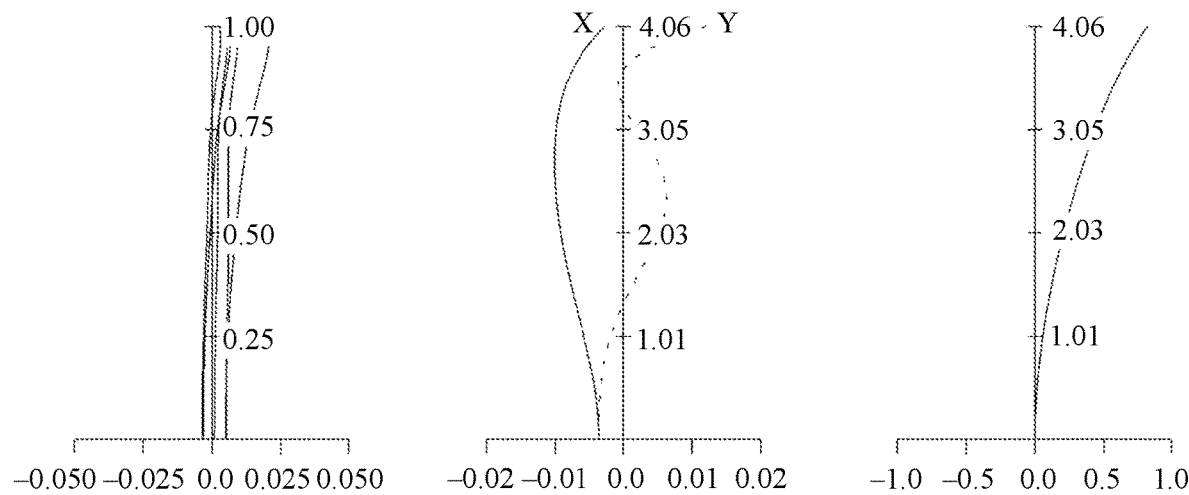
FIG. 8 is a diagram of a simulation effect of the long-focus lens shown in FIG. 7 in a possible embodiment.

FIG. 8 is a diagram of a simulation effect of the long-focus lens 1 shown in FIG. 7 in a possible embodiment.

FIG. 8 includes an axial chromatic aberration curve diagram, an astigmatic curvature of field diagram, and a distortion diagram of the long-focus lens 1. The axial chromatic aberration curve diagram includes spherical aberration curves of different bands corresponding to a system (the figure includes 650 nm, 610 nm, 555 nm, 510 nm, and 470 nm). A horizontal coordinate of the curve diagram is a deviation value along the optical axis, and a vertical coordinate of the curve diagram is a normalized coordinate at a pupil. The values shown in FIG. 8 are all small, and an axial aberration (a spherical aberration, a chromatic aberration, or the like) of the long-focus lens 1 is well corrected. The astigmatic field curvature diagram is used to show deviations between convergence points of pencils in different fields of view and an ideal imaging plane. X is a beam in a sagittal direction, and Y is a beam in a meridian direction. A horizontal coordinate of the curve diagram is a deviation value along the optical axis, and a vertical coordinate of the curve diagram is a corresponding field of view. When a value of a field of view is excessively large, image quality of the field of view is poor or a high-level aberration exists. As shown in FIG. 8, field curvatures are small in both directions, and the system has a good focal depth. The distortion diagram is used to represent relative deviations of beam convergence points (actual image heights) from an ideal image height in different fields of view. FIG. 8 shows that the relative deviations are all within 1%. This may ensure that there is no clear deformation.

Figure 9:
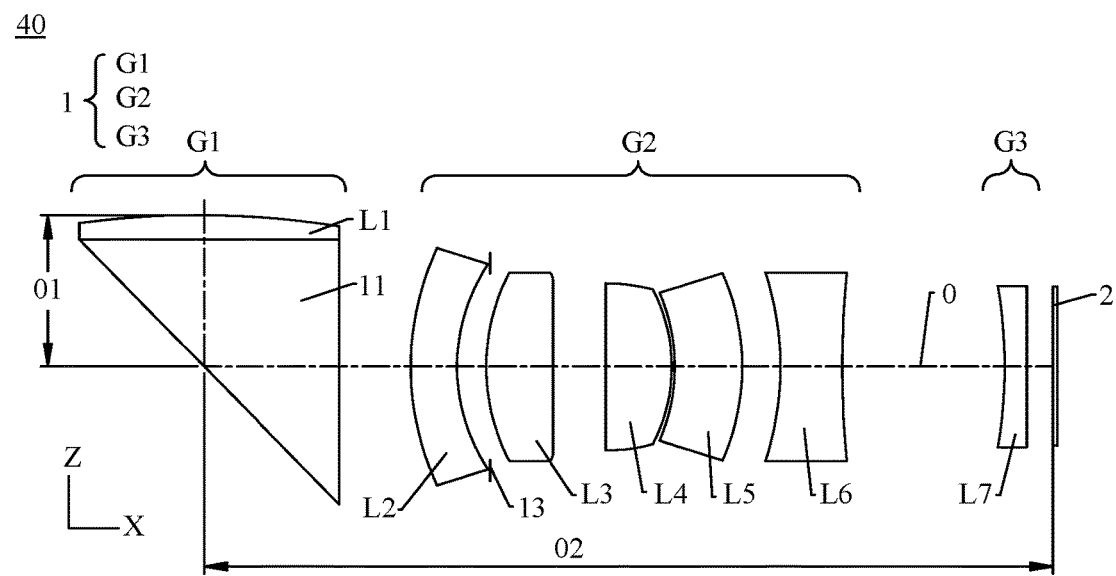
FIG. 9 is a schematic diagram of a partial structure of the camera module shown in FIG. 2 in some other embodiments.

FIG. 9 is a schematic diagram of a partial structure of the camera module 40 shown in FIG. 2 in some other embodiments. The camera module 40 shown in FIG. 9 includes most technical features of the camera module 40 shown in FIG. 3. The following mainly describes differences between the two, and most content that is the same between the two is not described again.

In some embodiments, the camera module 40 includes a long-focus lens 1 and a photosensitive element 2. The photosensitive element 2 is located on an image side of the long-focus lens 1. The long-focus lens 1 includes a first lens assembly G1, a second lens assembly G2, and a third lens assembly G3 that are arranged from an object side to an image side. The first lens assembly G1 and the third lens assembly G3 are fixed lens assemblies. In a focusing process in which the long-focus lens 1 is switched from a long shot to a close-up, the second lens assembly G2 moves toward the object side along an optical axis O.

The first lens assembly G1 includes a first lens L1 and a first reflection member 11. The second lens assembly G2 includes a second lens L2, a third lens L3, a fourth lens L4, a fifth lens L5, and a sixth lens L6 that are arranged from the object side to the image side. For example, the second lens L2 has a negative focal power, and the second lens L2 is made of a resin material. A convex surface is provided at a paraxial axis of an object side surface of the second lens L2, and a concave surface is provided at a paraxial axis of an image side surface of the second lens L2, both being aspheric surfaces. The third lens L3 has a positive focal power, and the third lens L3 is made of a resin material. A convex surface is provided at a paraxial axis of an object side surface of the third lens L3, and a concave surface is provided at a paraxial axis of an image side surface of the third lens L3, both being aspheric surfaces. The third lens assembly G3 includes a seventh lens L7, and the third lens assembly G3 does not include a second reflection member 12. The seventh lens L7 may be made of a glass material. The optical axis O includes a first part O1 from the object side surface of the first lens L1 to the reflective surface 111 of the first reflection member 11 and a second part O2 from the reflective surface 111 of the first reflection member 11 to the photosensitive element 2.

In some embodiments, the first lens assembly G1 and the photosensitive element 2 may move in different directions, to implement image stabilization in a shooting process. Moving directions of the first lens assembly G1 and the photosensitive element 2 are both perpendicular to the second part O2 of the optical axis O, and the moving directions of the first lens assembly G1 and the photosensitive element 2 intersect, for example, may be perpendicular to each other.

In some embodiments, the camera module 40 may not be separately provided with a light filter. For example, a light filter film is disposed on an object side surface of the first reflection member 11 and/or an image side surface of the first reflection member 11, and is configured to filter out an undesired optical signal. Alternatively, the first reflection member 11 is added with an absorbent material, configured to filter out an undesired optical signal. Certainly, in some other embodiments, a ray filtering function equivalent to a light filter may be implemented in another optical element by coating, adding an absorbent substance, or in another manner.

With reference to data and a simulation result, the following presents a specific solution of the long-focus lens 1 shown in FIG. 9 in a possible embodiment.

Referring to Table 3a to Table 3c together, Table 3a shows a curvature radius, an interval, a refractive index (Nd), and a dispersion coefficient of each lens and the light filter 3 when the long-focus lens 1 shown in FIG. 9 focuses on a long shot in a possible embodiment. An interval includes a thickness of a lens and a spacing between lenses. The dispersion coefficient is the Abbe number. Table 3b and Table 3c show aspheric coefficients of the lenses of the long-focus lens 1 shown in FIG. 9 in a possible embodiment.

TABLE 3a

| Surface number | Description | Surface type | Curvature radius | Thickness | Refractive index | Dispersion coefficient |
| --- | --- | --- | --- | --- | --- | --- |
| S1 | L1 | Spherical surface | 51.6649 | 0.71 | 1.803 | 46.8 |
| S2 | L1 | Flat surface | Infinite | 0 | | |
| S3 | First reflection member | Flat surface | Infinite | 3.39 | 1.803 | 46.8 |
| S4 | First reflection member | Reflective surface | Infinite | 4.1 | 1.803 | 46.8 |
| S5 | First reflection member | Flat surface | Infinite | 2.3 (variable) | | |
| S6 | L2 | Aspheric surface | 7.1116 | 1.417 | 1.67 | 19.6 |
| S7 | L2 | Aspheric surface | 4.5667 | 0.8691 | | |

TABLE 3a-continued

| Surface number | Description | Surface type | Curvature radius | Thickness | Refractive index | Dispersion coefficient |
|---|---|---|---|---|---|---|
| STO | Aperture diaphragm | Flat surface | Infinite | 0.02 | | |
| S8 | L3 | Aspheric surface | 5.9635 | 2 | 1.544 | 56 |
| S9 | L3 | Aspheric surface | 99.7341 | 1.6328 | | |
| S10 | L4 | Aspheric surface | −106.6596 | 2 | 1.544 | 56 |
| S11 | L4 | Aspheric surface | −5.3783 | 0.0994 | | |
| S12 | L5 | Aspheric surface | −5.738 | 2 | 1.749 | 35.5 |
| S13 | L5 | Aspheric surface | −6.9685 | 1.1894 | | |
| S14 | L6 | Aspheric surface | −13.7979 | 1.892 | 1.495 | 69.6 |
| S15 | L6 | Aspheric surface | 11.8756 | 4.9424 (variable) | | |
| S16 | L7 | Spherical surface | −14.2699 | 0.7 | 1.517 | 64.2 |
| S17 | L7 | Flat surface | Infinite | 0.37 | | |
| S22 | Imaging plane | | | | | |

TABLE 3b

| Surface number | K | A4 | A6 | A8 | A10 |
|---|---|---|---|---|---|
| S6 | 0 | −9.374126E−04 | −1.656378E−04 | 3.143511E−05 | −3.075752E−06 |
| S7 | 0 | −1.720488E−03 | −2.651492E−04 | 2.648223E−05 | 1.861593E−06 |
| S8 | 0 | −2.521112E−04 | −1.365630E−04 | 8.494817E−06 | −1.823777E−07 |
| S9 | 0 | −1.817557E−04 | −3.172909E−05 | −1.081049E−05 | 1.389196E−07 |
| S10 | 0 | 8.439839E−04 | 1.811318E−05 | −3.014406E−06 | −3.650348E−07 |
| S11 | 0 | −2.409826E−04 | −3.488973E−05 | −2.975447E−06 | −4.203269E−08 |
| S12 | 0 | −4.152472E−04 | −8.384847E−05 | −9.764270E−06 | −8.990738E−07 |
| S13 | 0 | 1.477100E−03 | −6.454425E−05 | −1.406607E−05 | 6.082450E−07 |
| S14 | 0 | −1.272468E−03 | −7.316947E−05 | −2.569879E−05 | 1.068264E−06 |
| S15 | 0 | −2.838461E−03 | 1.095766E−04 | −1.847506E−05 | 1.622217E−06 |

TABLE 3c

| Surface number | A12 | A14 | A16 |
|---|---|---|---|
| S6 | 1.654986E−07 | −3.442967E−09 | |
| S7 | −3.750079E−07 | 1.212333E−08 | 7.954110E−10 |
| S8 | 0.000000E+00 | 0.000000E+00 | 0.000000E+00 |
| S9 | | | |
| S10 | −1.669535E−08 | | |
| S11 | 7.158212E−08 | | |
| S12 | 1.961326E−07 | | |
| S13 | 1.745136E−08 | | |
| S14 | 4.365635E−08 | | |
| S15 | −4.782783E−08 | | |

The aspheric surface of the long-focus lens 1 in Table 3a may be defined by using, but not limited to, the following aspheric curve equation:

$$z = \frac{cr^2}{1 + \sqrt{1 - (1+k)c^2r^2}} + \sum_{i=1}^{N} \alpha_i r^{2i}$$

Herein, z is a relative distance between a point that is on the aspheric surface and that is at a distance of r from the optical axis and an intersecting tangent plane tangent to the optical axis of the aspheric surface; r is a vertical distance between the point on the aspheric curve and the optical axis; c is a curvature; k is a cone coefficient; and $\alpha_i$ is an $i^{th}$-order aspheric coefficient. For details, refer to Table 3b and 3c.

Table 3d and Table 3e show basic parameters of the long-focus lens 1 shown in FIG. 9 in a possible embodiment. Herein, f1 to f7 in Table 3d are respectively focal lengths of the first lens L1 to the seventh lens L7 respectively, and F1 to F3 in Table 3e are focal lengths of the first lens assembly G1 to the third lens assembly G3 respectively.

TABLE 3d

| Parameter (mm) | ImgH | EFL | f1 | f2 | f3 | f4 | f5 | f6 | f7 | Aperture value |
|---|---|---|---|---|---|---|---|---|---|---|
| Value | 4.1 | 16.85 | 115.8 | −24.34 | 11.62 | 10.3 | −142.95 | −12.55 | −27.53 | 2.4 |

TABLE 3e

| Parameter (mm) | F1 | F2 | F3 | Thickness (O1 + O3) | TTL (O1 + O2) | F1/EFL | F2/EFL |
|---|---|---|---|---|---|---|---|
| Value | 115.8 | 19.79 | −27.53 | / | 29.63 | 6.87 | 1.17 |

In this embodiment, the aperture value of the long-focus lens 1 is 2.4. When the long-focus lens 1 is switched from a long shot to a close-up, for example, switched to focus on a close-up at 1 m, a focusing stroke of the second lens assembly G2 is 0.284 mm, and is clearly shorter than a focusing stroke (which generally needs to be greater than 0.3 mm) of a conventional lens. When the long-focus lens 1 focuses on a long shot, a combined focal length of the first lens assembly G1 and the second lens assembly G2 is 16.34 mm, a combined focal length of the second lens assembly G2 and the third lens assembly G3 is 25.16 mm, and an effective focal length of the long-focus lens 1 is 16.85 mm. When the long-focus lens 1 focuses on a close-up, the combined focal length of the first lens assembly G1 and the second lens assembly G2 is 16.28 mm, the combined focal length of the second lens assembly G2 and the third lens assembly G3 is 24.83 mm, and the effective focal length of the long-focus lens 1 is 16.62 mm. Therefore, in a focusing process in which the long-focus lens 1 is switched from a long shot to a close-up, the second lens assembly G2 moves to an object side, the focusing stroke is short, and a focusing capability is strong. The combined focal length of the first lens assembly G1 and the second lens assembly G2, the combined focal length of the second lens assembly G2 and the third lens assembly G3, and the effective focal length of the long-focus lens 1 are all reduced.

Figure 10:
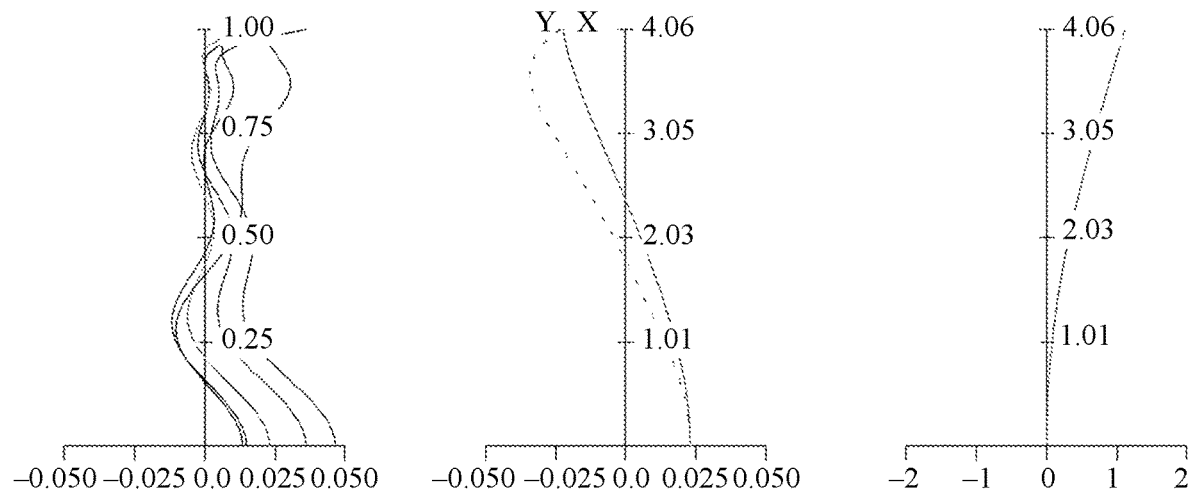
FIG. 10 is a diagram of a simulation effect of the long-focus lens shown in FIG. 9 in a possible embodiment.

FIG. 10 is a diagram of a simulation effect of the long-focus lens 1 shown in FIG. 9 in a possible embodiment.

FIG. 10 includes an axial chromatic aberration curve diagram, an astigmatic curvature of field diagram, and a distortion diagram of the long-focus lens 1. The axial chromatic aberration curve diagram includes spherical aberration curves of different bands corresponding to a system (the figure includes 650 nm, 610 nm, 555 nm, 510 nm, and 470 nm). A horizontal coordinate of the curve diagram is a deviation value along the optical axis, and a vertical coordinate of the curve diagram is a normalized coordinate at a pupil. The values shown in FIG. 10 are all small, and an axial aberration (a spherical aberration, a chromatic aberration, or the like) of the long-focus lens 1 is well corrected. The astigmatic field curvature diagram is used to show deviations between convergence points of pencils in different fields of view and an ideal imaging plane. X is a beam in a sagittal direction, and Y is a beam in a meridian direction. A horizontal coordinate of the curve diagram is a deviation value along the optical axis, and a vertical coordinate of the curve diagram is a corresponding field of view. When a value of a field of view is excessively large, image quality of the field of view is poor or a high-level aberration exists. As shown in FIG. 10, field curvatures are small in both directions, and the system has a good focal depth. The distortion diagram is used to represent relative deviations of beam convergence points (actual image heights) from an ideal image height in different fields of view. FIG. 10 shows that the relative deviations are all within 1%. This may ensure that there is no clear deformation.

Figure 11:
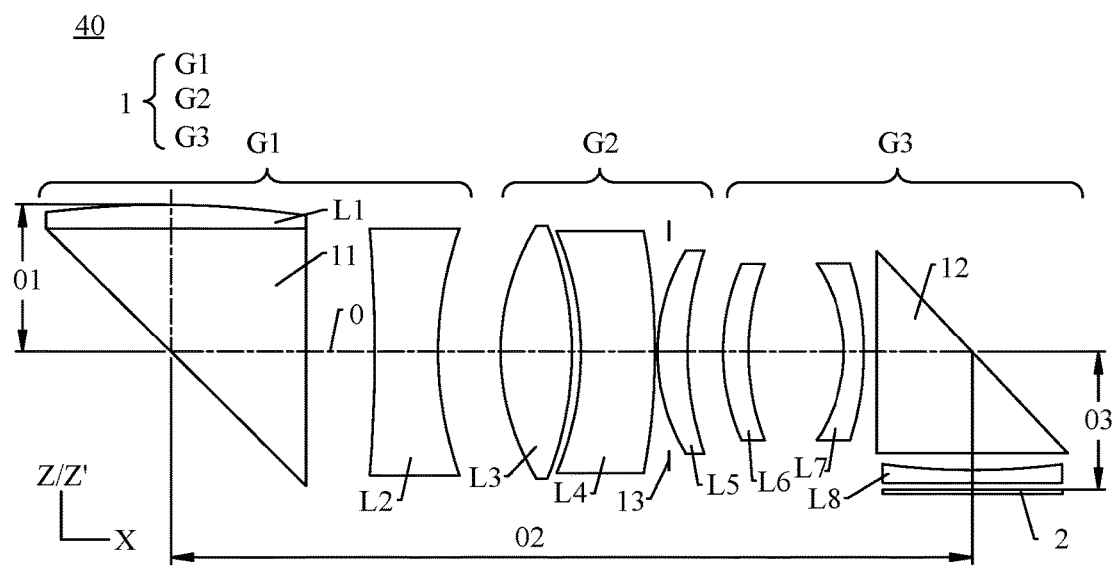
FIG. 11 is a schematic diagram of a partial structure of the camera module shown in FIG. 2 in some other embodiments.

FIG. 11 is a schematic diagram of a partial structure of the camera module 40 shown in FIG. 2 in some other embodiments. The camera module 40 shown in FIG. 11 includes most technical features of the camera module 40 shown in FIG. 3. The following mainly describes differences between the two, and most content that is the same between the two is not described again.

In some embodiments, the camera module 40 includes a long-focus lens 1 and a photosensitive element 2. The photosensitive element 2 is located on an image side of the long-focus lens 1. The long-focus lens 1 includes a first lens assembly G1, a second lens assembly G2, and a third lens assembly G3 that are arranged from an object side to an image side. The first lens assembly G1 and the third lens assembly G3 are fixed lens assemblies. In a focusing process in which the long-focus lens 1 is switched from a long shot to a close-up, the second lens assembly G2 moves toward the object side along an optical axis O.

In some embodiments, the first lens assembly G1 may include a first lens L1, a first reflection member 11, and a second lens L2 that are arranged from the object side to the image side. The first lens L1 has a positive focal power. A convex surface, for example, a spherical surface, is provided at a paraxial axis of an object side surface of the first lens L1, to reduce a processing difficulty. An Abbe number of the first lens L1 is greater than 40, to ensure that no excessively large residual chromatic aberration is generated, to reduce design difficulty of a lens assembly located on an image side of the first lens assembly. The second lens L2 has a negative focal power, so that an incident angle of a light beam on the second lens assembly G2 can be reduced, to reduce a design difficulty of the second lens assembly G2, and achieve a better imaging effect. In some other embodiments, an aspheric surface may be provided at the paraxial axis of the object side surface of the first lens L1.

The second lens assembly G2 includes a third lens L3, a fourth lens L4, and a fifth lens L5 that are arranged from the object side to the image side. The third lens L3 has a positive focal power. The third lens L3 can converge a light beam emitted from the second lens L2, so that the light beam smoothly enters the second lens assembly G2, to help improve imaging quality of the long-focus lens 1. The third lens L3 may be made of a resin material. A convex surface is provided at a paraxial axis of an object side surface of the third lens L3, and a convex surface is provided at a paraxial axis of an image side surface of the third lens L3, both being aspheric surfaces.

The third lens assembly G3 includes a sixth lens L6, a seventh lens L7, a second reflection member 12, and an eighth lens L8 that are arranged from the object side to the image side. The eighth lens L8 has a negative focal power and is close to the photosensitive element 2, so that image quality can be well compensated, and the imaging quality of the long-focus lens 1 can be improved.

The optical axis O includes a first part O1 from the object side surface of the first lens L1 to the reflective surface 111 of the first reflection member 11, a second part O2 from the reflective surface 111 of the first reflection member 11 to a reflective surface 121 of the second reflection member 12, and a third part O3 from the reflective surface 121 of the second reflection member 12 to a photosensitive element 2.

For example, the aperture diaphragm 13 may be located between the fourth lens L4 and the fifth lens L5. An aperture size of the aperture diaphragm 13 may be adjusted according to different shooting environments.

In some embodiments, the camera module 40 may not be separately provided with a light filter. For example, a light filter film is disposed on an object side surface of the second reflection member 12 and/or an image side surface of the second reflection member 12, and is configured to filter out an undesired optical signal. Alternatively, the second reflection member 12 is added with an absorbent material, configured to filter out an undesired optical signal. Certainly, in some other embodiments, a ray filtering function equivalent to a light filter may be implemented in another optical element (for example, the first reflection member 11) by coating, adding an absorbent substance, or in another manner.

With reference to data and a simulation result, the following presents a specific solution of the long-focus lens 1 shown in FIG. 11 in a possible embodiment.

Referring to Table 4a to Table 4c together, Table 4a shows a curvature radius, an interval, a refractive index (Nd), and a dispersion coefficient of each lens and the light filter 3 when the long-focus lens 1 shown in FIG. 11 focuses on a long shot in a possible embodiment. An interval includes a thickness of a lens and a spacing between lenses. The dispersion coefficient is the Abbe number. Table 4b and Table 4c show aspheric coefficients of the lenses of the long-focus lens 1 shown in FIG. 11 in a possible embodiment.

TABLE 4a

| Surface number | Description | Surface type | Curvature radius | Thickness | Refractive index | Dispersion coefficient |
|---|---|---|---|---|---|---|
| S1 | L1 | Spherical surface | 24.089 | 0.71 | 1.802 | 44.3 |
| S2 | L1 | Flat surface | Infinite | 0 | | |
| S3 | First reflection member | Flat surface | Infinite | 3.39 | 1.802 | 44.3 |
| S4 | First reflection member | Reflective surface | Infinite | 4.1 | 1.802 | 44.3 |
| S5 | First reflection member | Flat surface | Infinite | 1.727 | | |
| S6 | L2 | Aspheric surface | −214.19 | 1.87 | 1.544 | 55.6 |
| S7 | L2 | Aspheric surface | 14.25 | 1.8546 (variable) | | |
| S8 | L3 | Aspheric surface | 10.65 | 2.033 | 1.544 | 55.6 |
| S9 | L3 | Aspheric surface | −8.45 | 0.1921 | | |
| S10 | L4 | Aspheric surface | −7.08 | 2.1226 | 1.671 | 19.3 |
| S11 | L4 | Aspheric surface | −17.12 | 0.4105 | | |
| STO | Aperture diaphragm | Flat surface | Infinite | −0.2905 | | |
| S12 | L5 | Aspheric surface | 4.91 | 0.7919 | 1.54 | 56 |
| S13 | L5 | Aspheric surface | 6.47 | 0.7581 (variable) | | |
| S14 | L6 | Aspheric surface | 5.75 | 0.7347 | 1.69 | 49.6 |
| S15 | L6 | Aspheric surface | 5.57 | 2.6562 | | |
| S16 | L7 | Aspheric surface | −7.66 | 0.6 | 1.573 | 37.7 |
| S17 | L7 | Aspheric surface | −23.83 | 0.3518 | | |
| S16 | Second reflection member | Flat surface | Infinite | 2.8 | 1.74 | 28.6 |
| S18 | Second reflection member | Reflective surface | Infinite | 2.8 | 1.74 | 28.6 |
| S19 | Second reflection member | Flat surface | Infinite | 0.4104 | | |
| S20 | L8 | Spherical surface | −30 | 0.35 | 1.52 | 64.2 |
| S21 | L8 | Flat surface | Infinite | 0.1 | | |
| S22 | Imaging plane | | | | | |

TABLE 4b

| Surface number | K | A4 | A6 | A8 | A10 |
|---|---|---|---|---|---|
| S6 | 0 | −0.000727045 | −1.35E−05 | 3.16E−07 | 2.97E−07 |
| S7 | 0 | −0.000290635 | −6.51E−05 | 4.28E−06 | 3.24E−07 |
| S8 | 0 | 0.000914625 | −8.66E−05 | 4.99E−06 | −7.49E−08 |
| S9 | 0 | −9.00E−05 | 4.20E−05 | −7.20E−06 | 1.03E−07 |
| S10 | 0 | 0.001082324 | −5.21E−05 | 2.05E−06 | −3.20E−07 |
| S11 | 0 | −0.000739066 | 4.56E−05 | −8.99E−07 | 8.44E−08 |

TABLE 4b-continued

| Surface number | K | A4 | A6 | A8 | A10 |
|---|---|---|---|---|---|
| S12 | 0 | −0.003403294 | 6.39E−05 | −5.11E−06 | 3.05E−07 |
| S13 | 0 | −0.000650005 | −4.12E−05 | 2.62E−06 | −1.05E−07 |
| S14 | 0 | 0.000380046 | 3.14E−05 | 4.86E−06 | −1.94E−08 |
| S15 | 0 | −0.000208542 | −6.60E−05 | 1.75E−05 | −1.05E−06 |
| S16 | 0 | −0.009268407 | 0.000475272 | 1.93E−06 | 1.75E−07 |
| S17 | 0 | −0.007145293 | 0.000563264 | 2.58E−06 | −3.05E−06 |

TABLE 4c

| Surface number | A12 | A14 | A16 |
|---|---|---|---|
| S6 | −2.06E−08 | 2.97E−10 | |
| S7 | −2.45E−08 | | |
| S8 | −9.44E−09 | | |
| S9 | 1.53E−08 | | |
| S10 | 3.02E−08 | | |
| S11 | −4.55E−09 | | |
| S12 | −1.39E−08 | | |
| S13 | −3.32E−09 | | |
| S14 | 1.54E−09 | | |
| S15 | 2.49E−08 | | |
| S16 | −6.07E−07 | 7.55E−08 | −2.09E−09 |
| S17 | 1.39E−07 | 9.60E−09 | −5.27E−10 |

The aspheric surface of the long-focus lens 1 in Table 4a may be defined by using, but not limited to, the following aspheric curve equation:

$$z = \frac{cr^2}{1+\sqrt{1-(1+k)c^2r^2}} + \sum_{i=1}^{N} \alpha_i r^{2i}$$

Herein, z is a relative distance between a point that is on the aspheric surface and that is at a distance of r from the optical axis O and an intersecting tangent plane tangent to the optical axis of the aspheric surface; r is a vertical distance between the point on the aspheric curve and the optical axis; c is a curvature; k is a cone coefficient; and $\alpha_i$ is an $i^{th}$-order aspheric coefficient. For details, refer to Table 4b and Table 4c.

Table 4d and Table 4e show basic parameters of the long-focus lens 1 shown in FIG. 11 in a possible embodiment. Herein, f1 to f8 in Table 4d are respectively focal lengths of the first lens L1 to the eighth lens L8 respectively, and F1 to F3 in Table 4e are focal lengths of the first lens assembly G1 to the third lens assembly G3 respectively.

TABLE 4d

| Parameter (mm) | ImgH | EFL | f1 | f2 | f3 | f4 | f5 | f6 | f7 | f8 | Aperture value |
|---|---|---|---|---|---|---|---|---|---|---|---|
| Value | 4.1 | 16.85 | 29.91 | −24.41 | 8.97 | −19.48 | 31.63 | 363.53 | −19.88 | −57.88 | 1.95 |

TABLE 4e

| Parameter (mm) | F1 | F2 | F3 | Thickness (O1 + O3) | TTL (O1 + O2 + O3) | F1/EFL | F2/EFL |
|---|---|---|---|---|---|---|---|
| Value | 383.78 | 11.2 | −15.55 | 7.76 | 30.47 | 22.78 | 0.66 |

In this embodiment, the aperture value of the long-focus lens 1 is 1.95. The aperture value of the long-focus lens 1 may be adjusted according to different shooting environments. When the long-focus lens 1 is switched from a long shot to a close-up, for example, switched to focus on a close-up at 1 m, a focusing stroke of the second lens assembly G2 is 0.205 mm, and is clearly shorter than a focusing stroke (which generally needs to be greater than 0.3 mm) of a conventional lens. When the long-focus lens 1 focuses on a long shot, a combined focal length of the first lens assembly G1 and the second lens assembly G2 is 14.47 mm, a combined focal length of the second lens assembly G2 and the third lens assembly G3 is 13.47 mm, and an effective focal length of the long-focus lens 1 is 16.85 mm. When the long-focus lens 1 focuses on a close-up, the combined focal length of the first lens assembly G1 and the second lens assembly G2 is 14.46 mm, the combined focal length of the second lens assembly G2 and the third lens assembly G3 is 13.26 mm, and the effective focal length of the long-focus lens 1 is 16.59 mm. Therefore, in a focusing process in which the long-focus lens 1 is switched from a long shot to a close-up, the second lens assembly G2 moves to an object side, the focusing stroke is short, and a focusing capability is strong. The combined focal length of the first lens assembly G1 and the second lens assembly G2, the combined focal length of the second lens assembly G2 and the third lens assembly G3, and the effective focal length of the long-focus lens 1 are all reduced.

Figure 12:
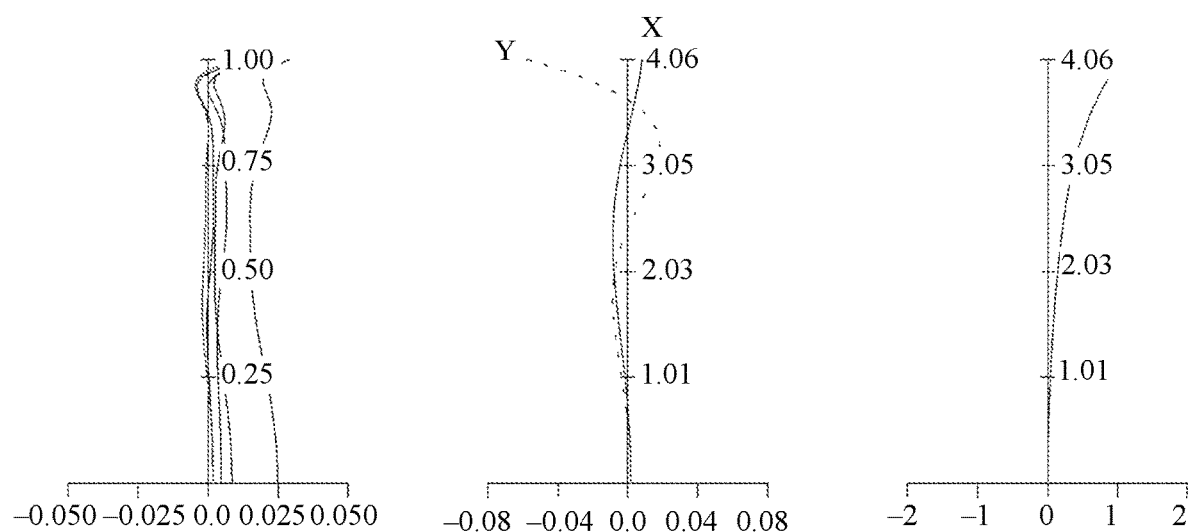
FIG. 12 is a diagram of a simulation effect of the long-focus lens shown in FIG. 11 in a possible embodiment.

FIG. 12 is a diagram of a simulation effect of the long-focus lens 1 shown in FIG. 11 in a possible embodiment.

FIG. 12 includes an axial chromatic aberration curve diagram, an astigmatic curvature of field diagram, and a distortion diagram of the long-focus lens 1. The axial chromatic aberration curve diagram includes spherical aberration curves of different bands corresponding to a system (the figure includes 650 nm, 610 nm, 555 nm, 510 nm, and 470 nm). A horizontal coordinate of the curve diagram is a deviation value along the optical axis, and a vertical coordinate of the curve diagram is a normalized coordinate at a pupil. The values shown in FIG. 12 are all small, and an axial aberration (a spherical aberration, a chromatic aberration, or the like) of the long-focus lens 1 is well corrected. The astigmatic field curvature diagram is used to show deviations between convergence points of pencils in different fields of view and an ideal imaging plane. X is a beam in a sagittal direction, and Y is a beam in a meridian direction. A horizontal coordinate of the curve diagram is a deviation value along the optical axis, and a vertical coordinate of the curve diagram is a corresponding field of view. When a value of a field of view is excessively large, image quality of the field of view is poor or a high-level aberration exists. As shown in FIG. 12, field curvatures are small in both directions, and the system has a good focal depth. The distortion diagram is used to represent relative deviations of beam convergence points (actual image heights) from an ideal image height in different fields of view. FIG. 12 shows that the relative deviations are all within 1%. This may ensure that there is no clear deformation.

In some other embodiments, in a focusing process in which the long-focus lens 1 is switched from a long shot to a close-up, if it is met that when the second lens assembly G2 moves toward the image side, a combined focal length of the first lens assembly G1 and the second lens assembly G2 decreases, and a combined focal length of the second lens assembly G2 and the third lens assembly G3 decreases, the first lens assembly G1 may have a negative focal power, the second lens assembly G2 may have a positive focal power, and the third lens assembly G3 may have a negative focal power.

In embodiments of this application, the long-focus lens and the camera module implement a larger clear aperture with a limited thickness, have a large aperture and a large target surface, have more uniform image quality when a shot object is at different focusing distances, have a strong focusing capability, have good imaging quality, and have a wide shooting range, so that macro shooting can be implemented.

In summary, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application. In a case that no conflict occurs, embodiments of this application and the features in the embodiments may be mutually combined.

What is claimed is:

1. A long-focus lens, comprising a first lens assembly, a second lens assembly, and a third lens assembly that are arranged from an object side to an image side, wherein the first lens assembly and the third lens assembly are fixed lens assemblies, and the second lens assembly is a focusing lens assembly; and in a focusing process in which the long-focus lens is switched from a long shot to a close-up, the second lens assembly moves toward the object side along an optical axis, a combined focal length of the first lens assembly and the second lens assembly decreases, and a combined focal length of the second lens assembly and the third lens assembly decreases;
wherein the first lens assembly comprises a first reflection member and a first lens, the first lens has a positive focal power and is located on a first object side of the first reflection member, the first reflection member changes a propagation direction of the optical axis from a first direction to a second direction, and the second direction intersects the first direction.

2. The long-focus lens according to claim 1, wherein the first lens assembly has a positive focal power, the second lens assembly has a positive focal power, and the third lens assembly has a negative focal power.

3. The long-focus lens according to claim 1, wherein a focal length F2 of the second lens assembly and an effective focal length (EFL) of the long-focus lens meet 0.2<F2/EFL<1.9.

4. The long-focus lens according to claim 1, wherein a focal length F3 of the third lens assembly and the effective focal length (EFL) of the long-focus lens meet −50<F3/EFL<−0.05.

5. The long-focus lens according to claim 1, wherein a focal length F1 of the first lens assembly and the effective focal length (EFL) of the long-focus lens meet 0.5<F1/EFL<50.

6. The long-focus lens according to claim 1, wherein the first reflection member is a prism, an image side surface of the first lens is a flat surface and is fastened to an object side surface of the first reflection member, and a curvature radius R1 of an object side surface of the first lens and a refractive index N1 of the first lens meet R1/N1>4.

7. The long-focus lens according to claim 1, wherein a reflective surface of the first reflection member is a flat surface, a spherical surface, a cylindrical surface, or a free curved surface.

8. The long-focus lens according to claim 1, wherein the first lens assembly comprises at least two lenses, and the last lens that is of the first lens assembly and that is closest to the image side is located on the first object side or a first image side of the first reflection member.

9. The long-focus lens according to claim 1, wherein the first lens assembly further comprises at least one lens that has a negative focal power and that is located on a first image side of the first reflection member.

10. The long-focus lens according to claim 9, wherein the second lens assembly comprises at least one lens, and the first lens that is of the second lens assembly and that is closest to the object side has a positive focal power.

11. The long-focus lens according to claim 1, wherein the third lens assembly comprises a second reflection member, the second reflection member changes the propagation direction of the optical axis from the second direction to a third direction, and the third direction intersects the second direction; and
the third lens assembly comprises at least one lens located on a second object side or a second image side of the second reflection member, or the third lens assembly comprises at least one lens located on the second object side of the second reflection member and at least one lens located on the second image side of the second reflection member.

12. The long-focus lens according to claim 1, wherein the third lens assembly comprises a second reflection member, the second reflection member changes the propagation direction of the optical axis from the second direction to a third direction, and the third direction intersects the second direction; and
the third lens assembly further comprises at least one lens that has a negative focal power and that is located on a second image side of the second reflection member.

13. The long-focus lens according to claim 1, wherein the first lens assembly comprises a lens having a positive focal power, and an Abbe number of the lens is greater than 40.

14. The long-focus lens according to claim 1, wherein the long-focus lens further comprises an aperture diaphragm, and the aperture diaphragm is mounted on the second lens assembly.

15. The long-focus lens according to claim 1, wherein an optical surface of at least one lens of the long-focus lens is an aspheric surface or a free curved surface.

16. The long-focus lens according to claim 1, wherein an optical surface of at least one lens of the long-focus lens forms a diffraction grating structure.

17. The long-focus lens according to claim 1, wherein the long-focus lens further comprises a liquid lens, and the liquid lens is located between the first lens assembly and the second lens assembly.

18. A camera module, comprising a photosensitive element and a long-focus lens, wherein the photosensitive element is located on an image side of the long-focus lens;

wherein the long-focus lens comprises a first lens assembly, a second lens assembly, and a third lens assembly that are arranged from an object side to the image side, wherein the first lens assembly and the third lens assembly are fixed lens assemblies, and the second lens assembly is a focusing lens assembly; and in a focusing process in which the long-focus lens is switched from a long shot to a close-up, the second lens assembly moves toward the object side along an optical axis, a combined focal length of the first lens assembly and the second lens assembly decreases, and a combined focal length of the second lens assembly and the third lens assembly decreases;

wherein the first lens assembly comprises a first reflection member and a first lens, the first lens has a positive focal power and is located on a first object side of the first reflection member, the first reflection member changes a propagation direction of the optical axis from a first direction to a second direction, and the second direction intersects the first direction.

19. An electronic device, comprising an image processor and a camera module, wherein the image processor is communicatively connected to the camera module, and the image processor is configured to obtain image data from the camera module and process the image data, wherein the camera module comprises:

a photosensitive element located on an image side of the long-focus lens, and a long-focus lens including a first lens assembly, a second lens assembly, and a third lens assembly that are arranged from an object side to the image side, wherein the first lens assembly and the third lens assembly are fixed lens assemblies, and the second lens assembly is a focusing lens assembly; and in a focusing process in which the long-focus lens is switched from a long shot to a close-up, the second lens assembly moves toward the object side along an optical axis, a combined focal length of the first lens assembly and the second lens assembly decreases, and a combined focal length of the second lens assembly and the third lens assembly decreases;

wherein the first lens assembly comprises a first reflection member and a first lens, the first lens has a positive focal power and is located on a first object side of the first reflection member, the first reflection member changes a propagation direction of the optical axis from a first direction to a second direction, and the second direction intersects the first direction.

* * * * *